INVENTORS
A. Russell, A. Hopton
& A. F. Carter
By Watson, Cole, Grindle & Watson

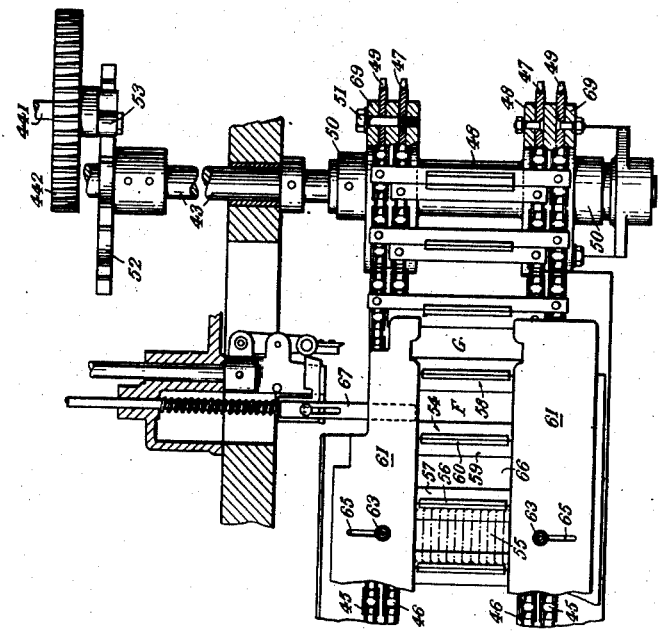

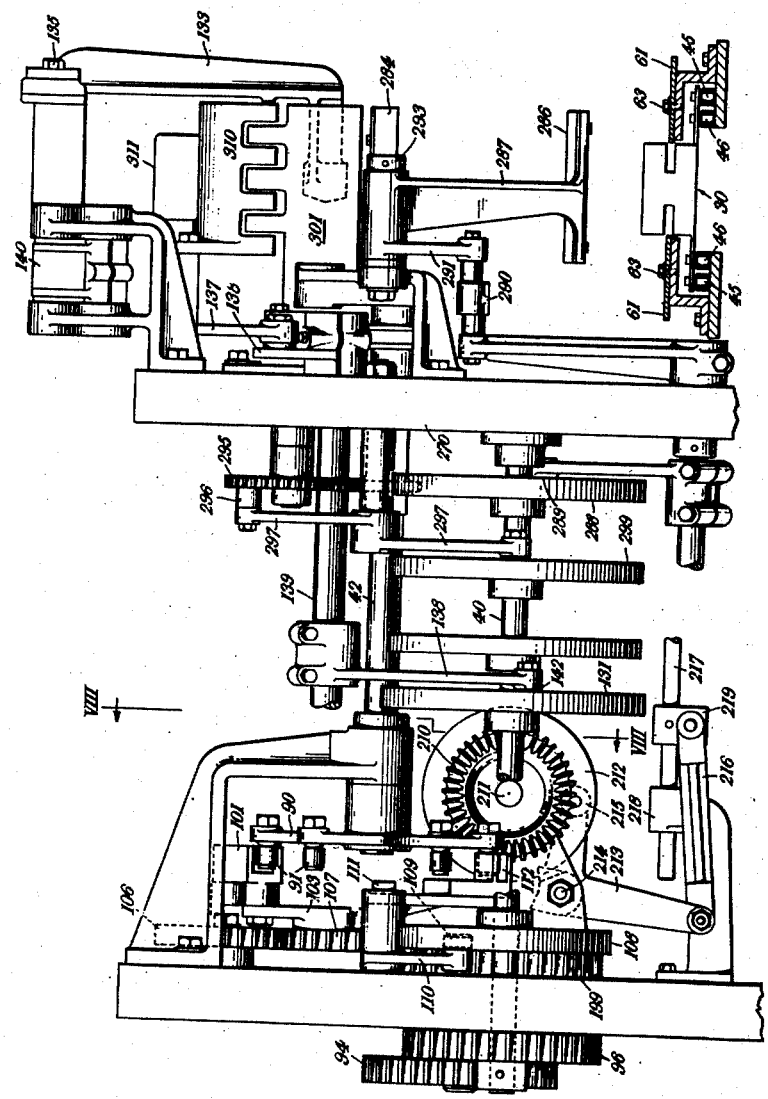

March 23, 1954　　　A. RUSSELL ET AL　　　2,672,717
WRAPPING MACHINE
Filed April 3, 1951　　　　　　　　　　17 Sheets-Sheet 7
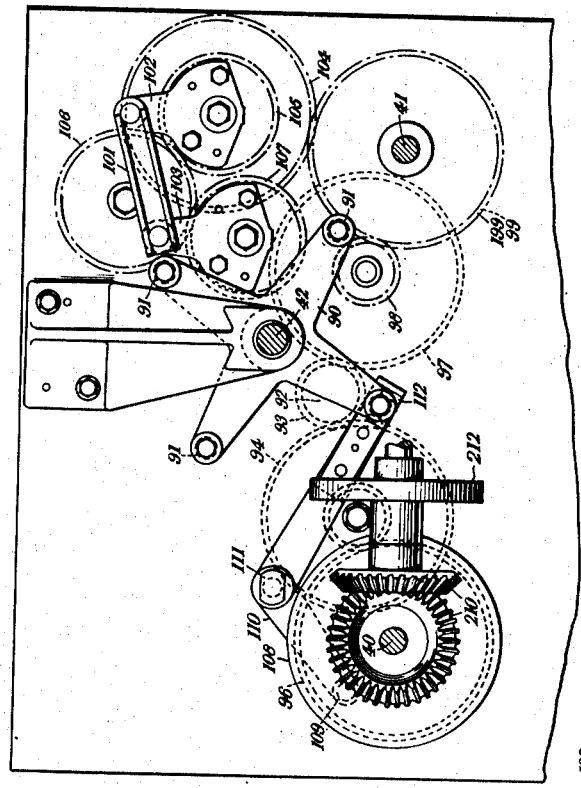
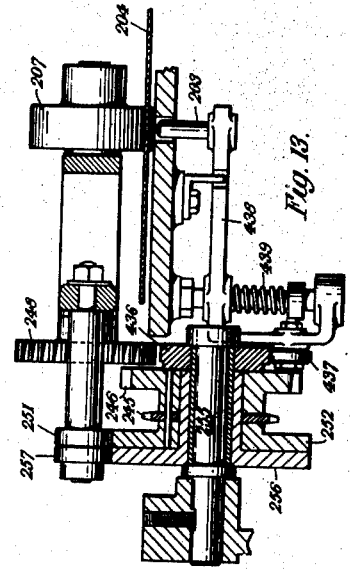
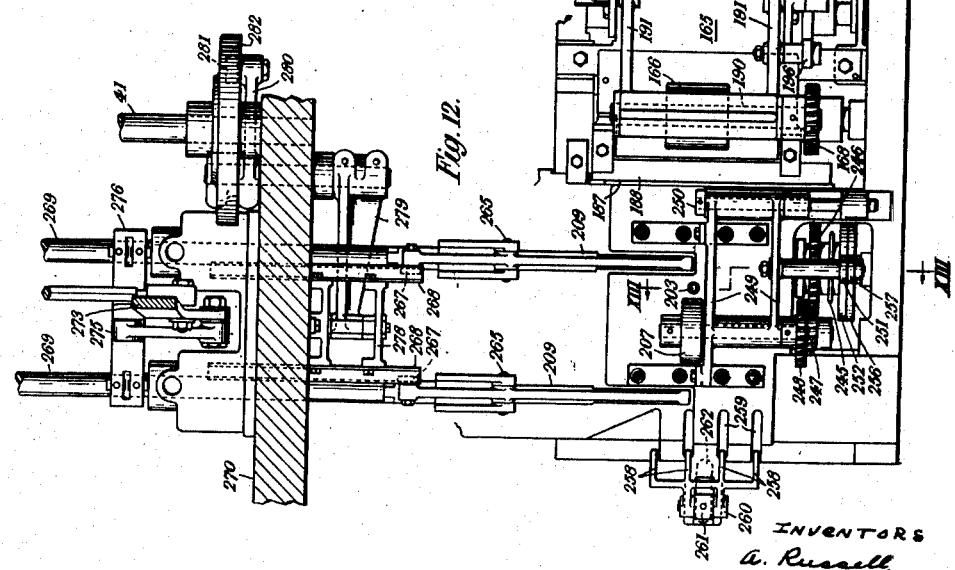
INVENTORS
A. Russell,
A. Hopton
& A. F. Carter
By Watson, Cole, Grindle & Watson

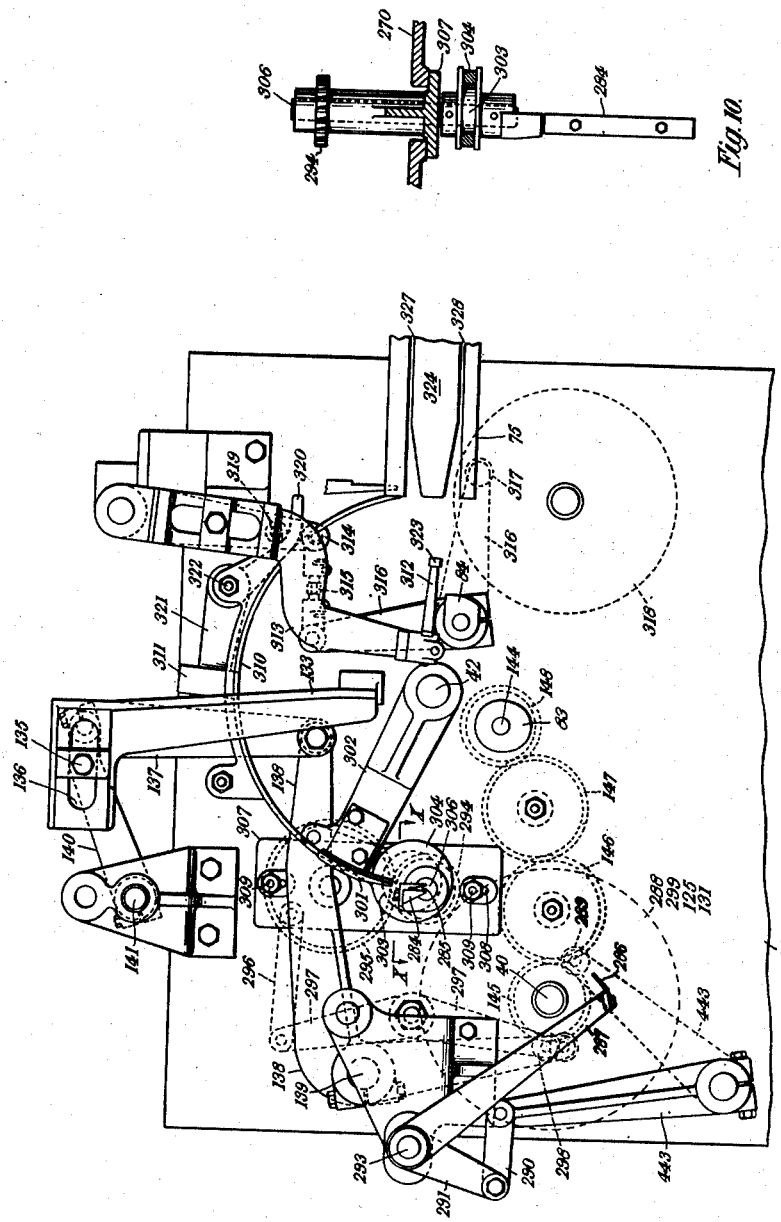

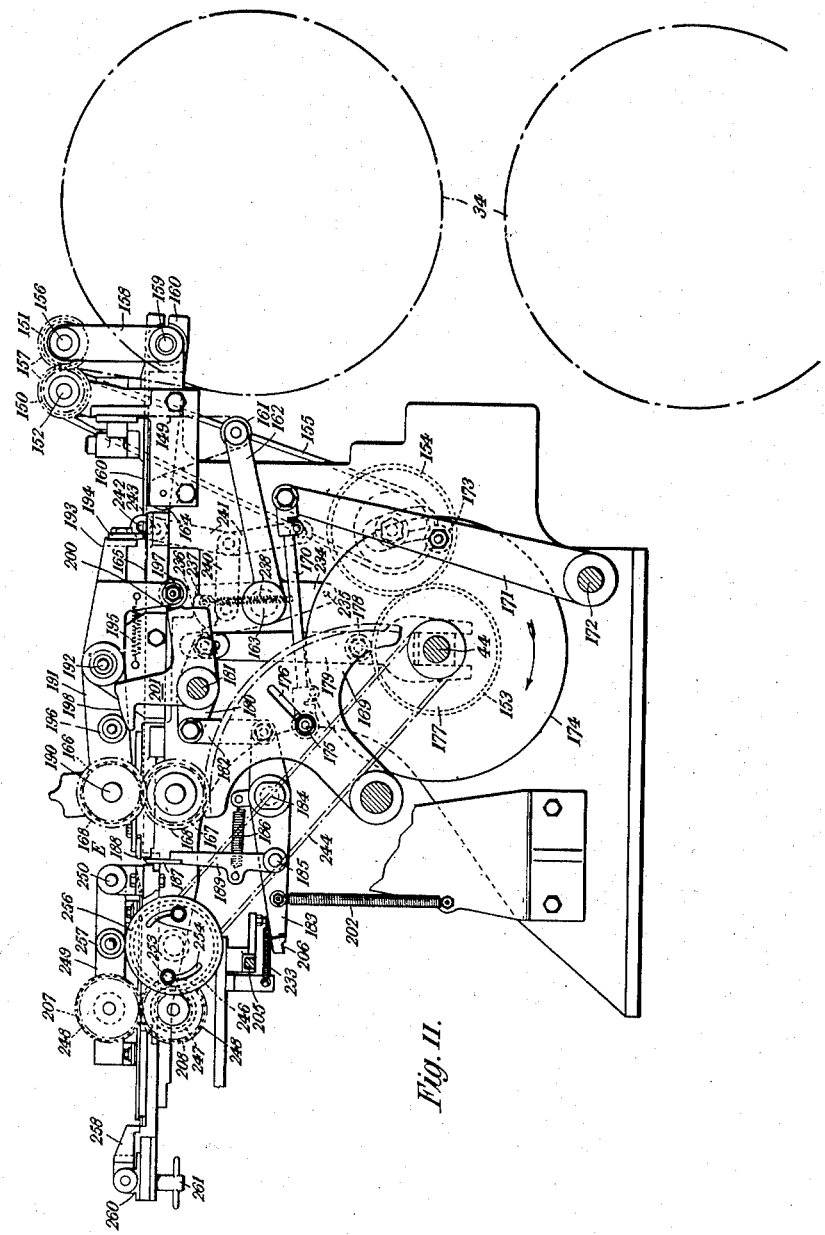

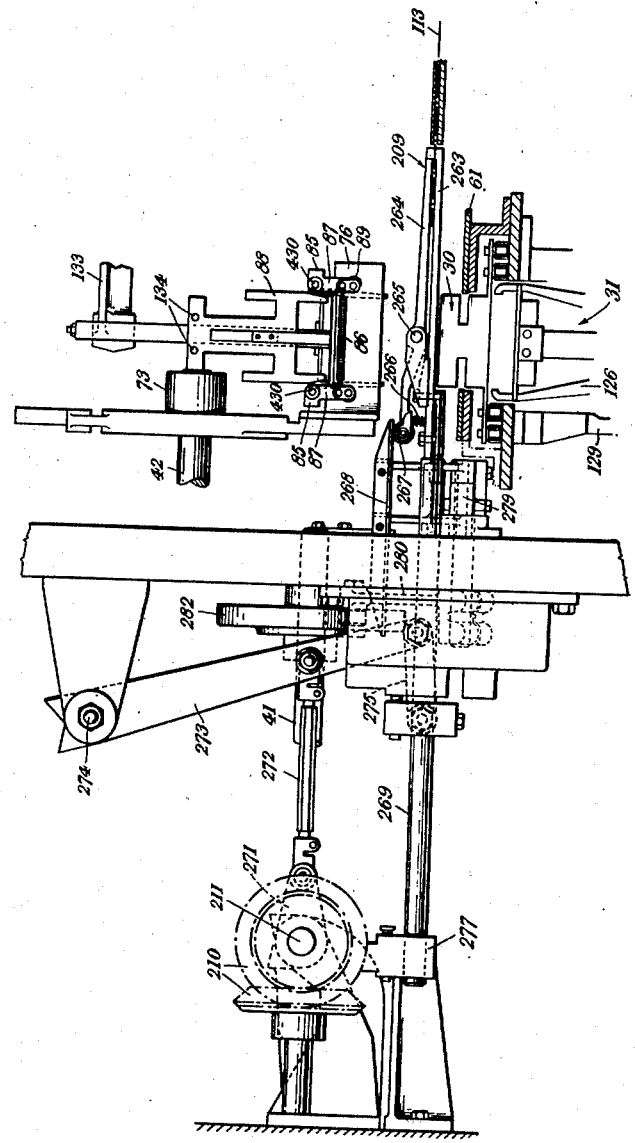

March 23, 1954    A. RUSSELL ET AL    2,672,717
WRAPPING MACHINE
Filed April 3, 1951    17 Sheets-Sheet 12

INVENTORS
A. Russell, A. Hopton
& A. F. Carter
By Watson, Cole, Grindle & Watson

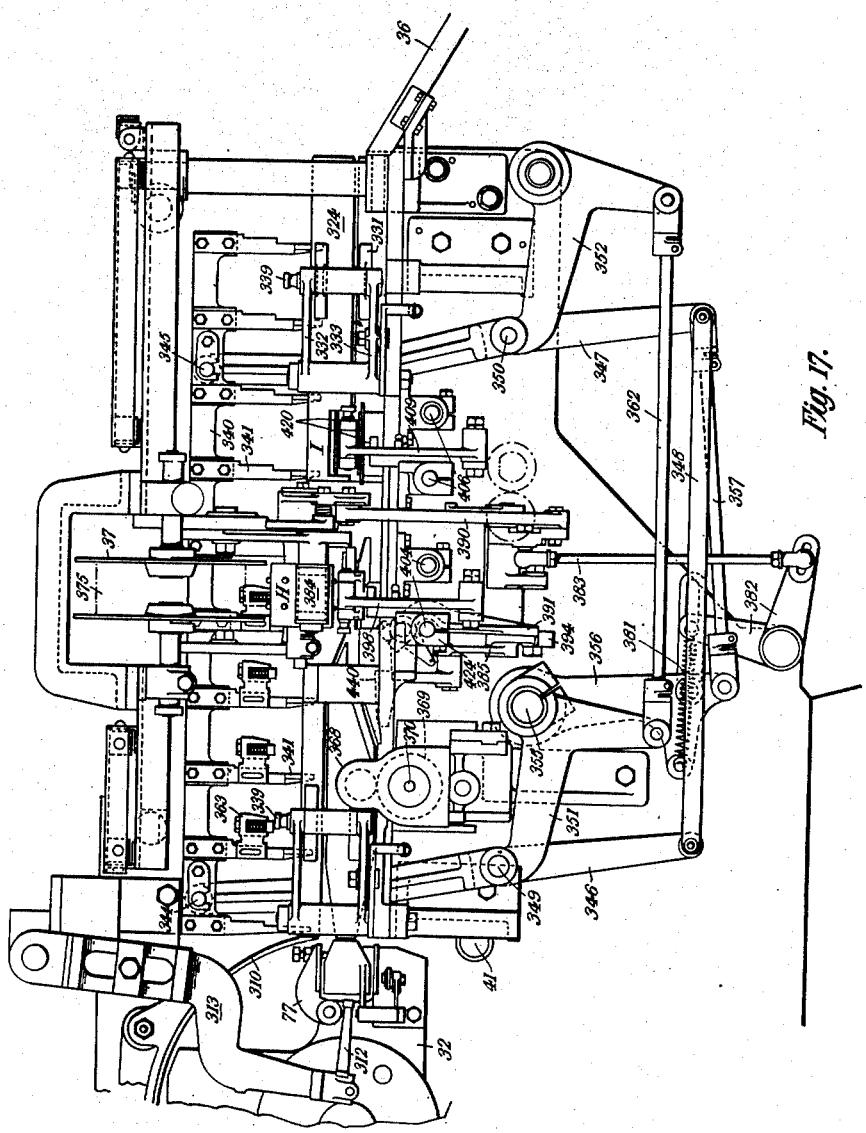

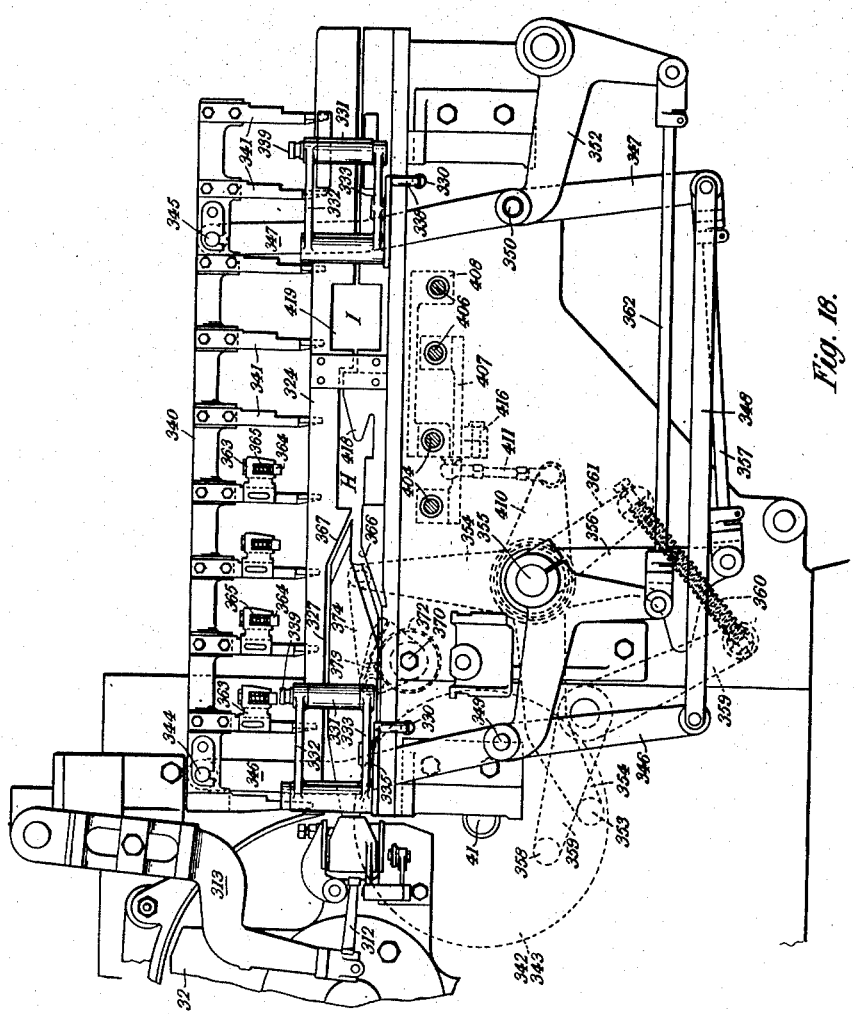

March 23, 1954   A. RUSSELL ET AL   2,672,717
WRAPPING MACHINE
Filed April 3, 1951
17 Sheets-Sheet 16

INVENTORS
A. Russell, A. Hoyton
& A. F. Carter
By Watson, Cole, Grindle & Watson

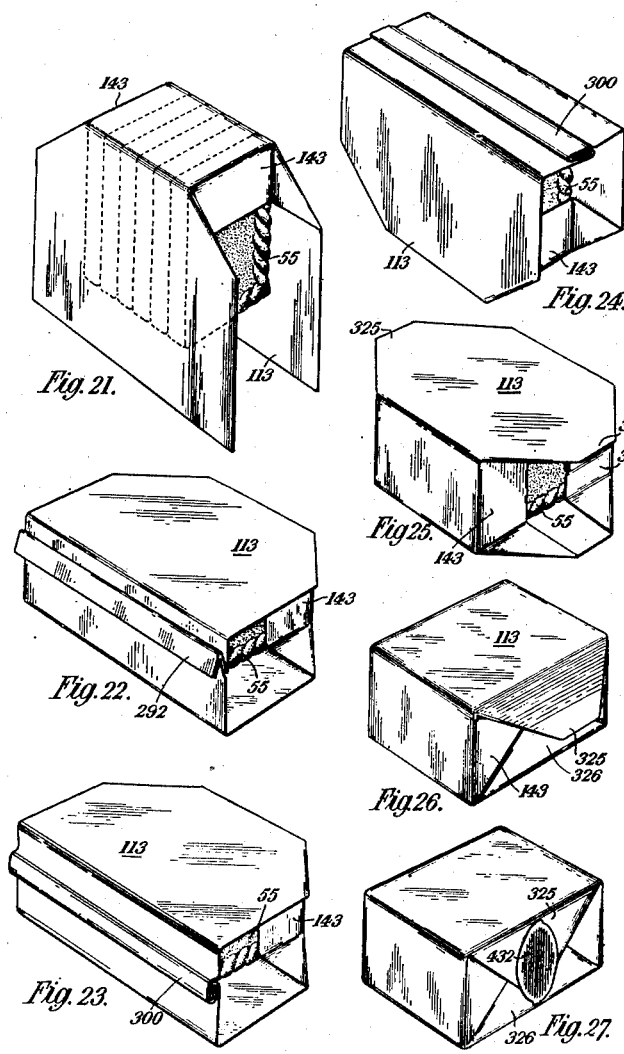

Patented Mar. 23, 1954

2,672,717

UNITED STATES PATENT OFFICE 2,672,717

WRAPPING MACHINE

Alexander Russell, Alan Hopton, and Arthur Francis Carter, Leeds, England, assignors to The Forgrove Machinery Company Limited, Leeds, England, a company of Great Britain Application April 3, 1951, Serial No. 219,016

Claims priority, application Great Britain April 3, 1950

25 Claims. (Cl. 53—41)

This invention relates to a machine for wrapping loose biscuits, or other thin articles of similar shape, and has for its object to provide a machine which is readily adjustable so that it may deal with biscuits of different shapes and sizes, and with packages accommodating different numbers of biscuits.

The machine according to the invention comprises an intermittently rotating wrapping wheel mounted to turn on a horizontal axis and having a number of pockets which move in succession from a loading station to a discharge station, each pocket serving to hold a stack of biscuits and having a fixed jaw which, when the pocket is at the loading station, extends vertically and, when the pocket is at the discharge station, extends horizontally and in alignment with a fixed horizontal discharge platform, a horizontal conveyor, which is intermittently driven in timed relationship with the pocket wheel to feed the stacks of biscuits in succession into position beneath the wrapping wheel, said conveyor comprising a series of spaced pushers, for feeding the stacks of biscuits forwards, which are brought successively into alignment with the fixed jaw of that pocket of the wrapping wheel which is at the loading position, an intermittently operated elevator for lifting the stacks of biscuits successively into the pockets after they arrive at the loading station, and means for feeding wrappers in succession into the path of the elevator so that a wrapper will be carried into the pocket at the loading station by each stack of biscuits, as it is lifted, and thereby folded in U-formation about the stack of biscuits.

The machine thus has three fixed datum points, viz. the position in relation to the conveyor of each pusher, the position occupied at the loading station by the fixed jaw of each pocket of the wrapping wheel and the position of the horizontal discharge platform. Changes in the machine to suit variations in size and shape of the wrapped package are all effected by interchange or adjustment of other parts of the conveyor, of the elevator, of the wrapping wheel, of the wrapper feed mechanism and of folding devices which cooperate with the wrapping wheel and with the discharge platform to complete the folding of the wrapper around each stack of biscuits.

One embodiment of wrapping machine according to the invention will now be described in detail, by way of example, with reference to the accompanying drawings, in which.

Figure 4:
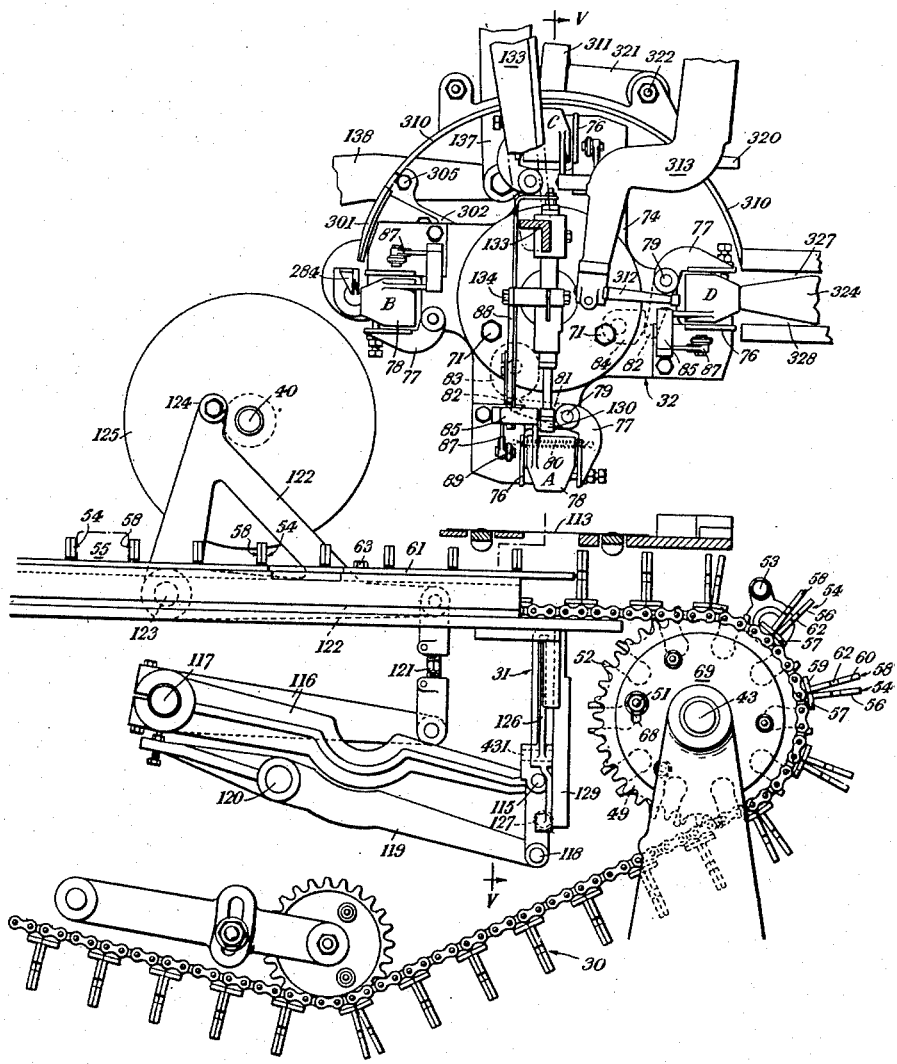
Figure 9A:
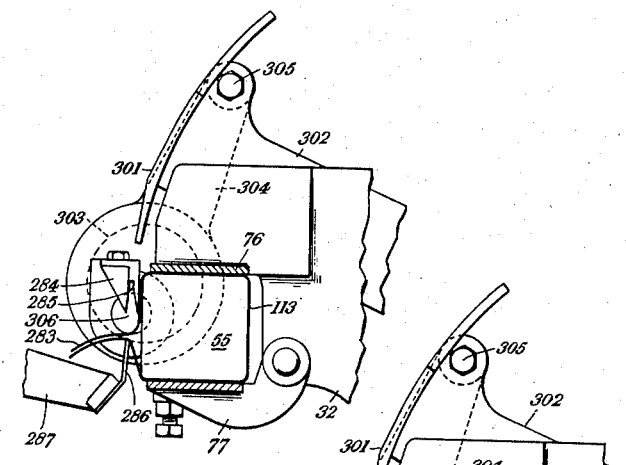
Figure 9B:
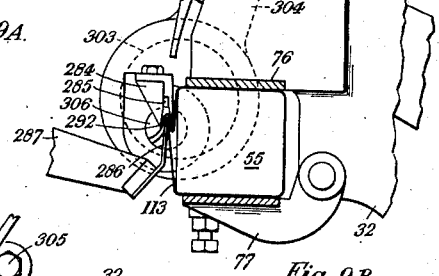
Figure 9C:
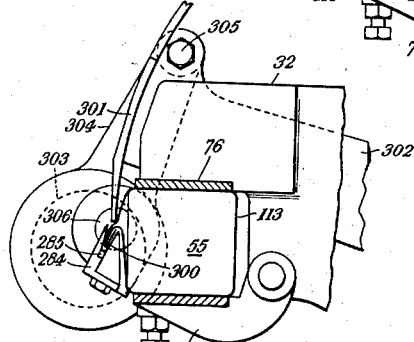
Figure 16:
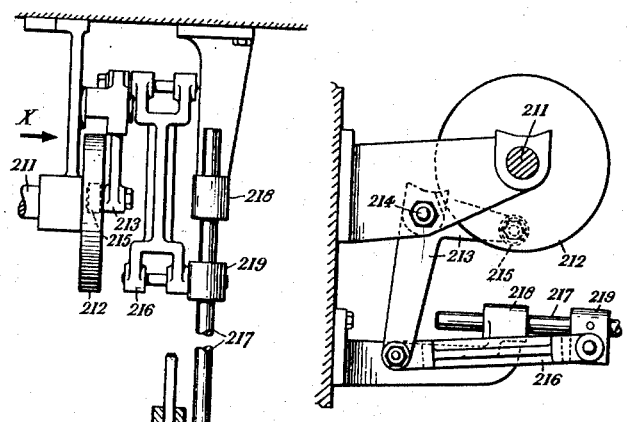
Figure 15:
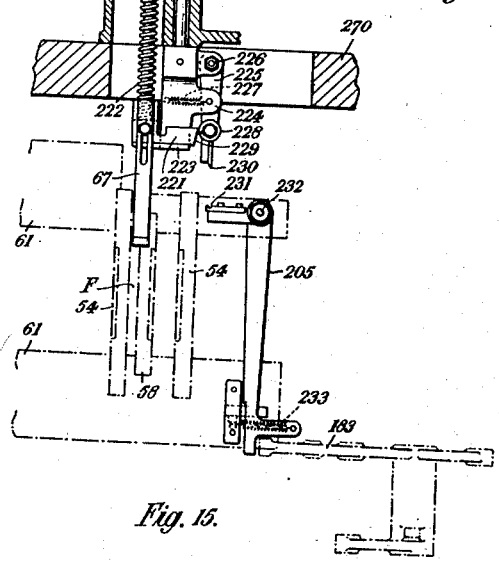
Figure 19:
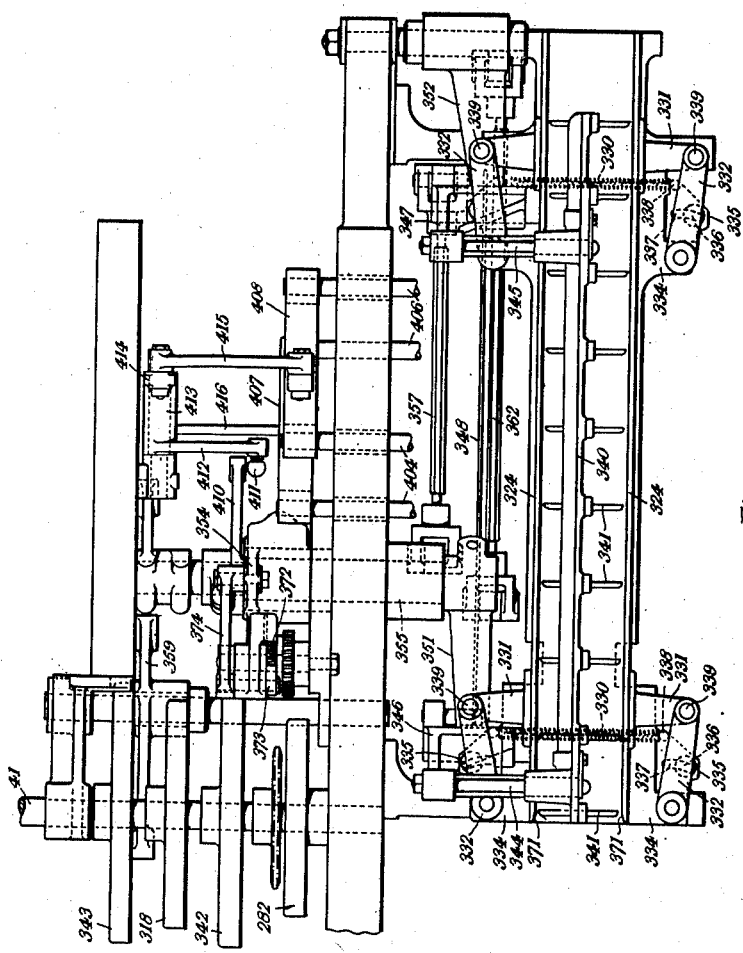
Figure 20:
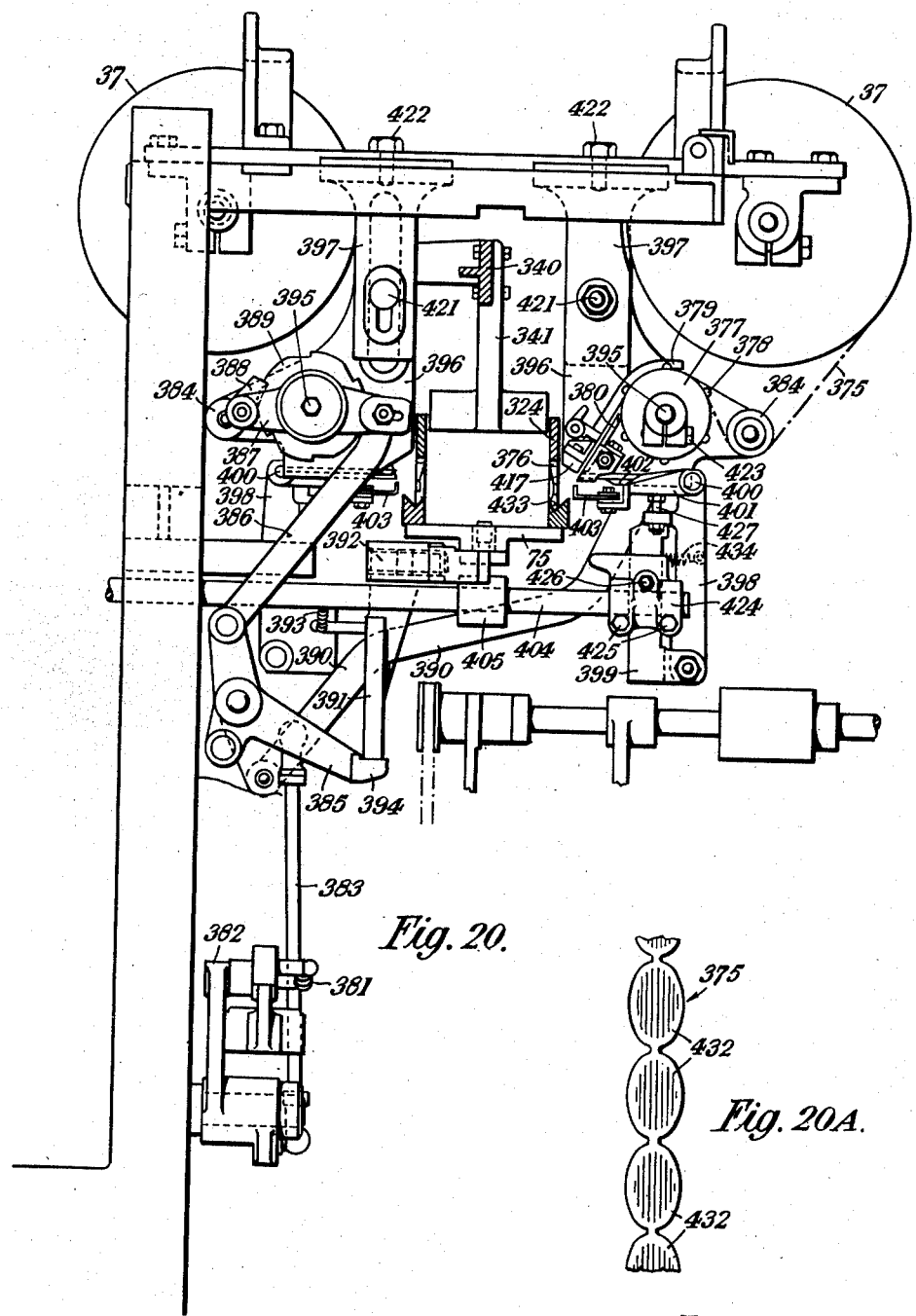
Figure 20A:
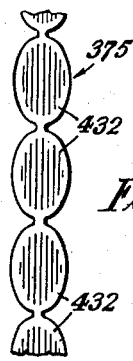

Fig. 4 is an enlarged side elevation of the right hand end of the conveyor, showing the wrapping wheel and elevator, Fig. 5 is a section taken on the line V—V in Fig. 4, Fig. 6 is a plan view of the right hand end of the conveyor, showing the feeler arm, Fig. 7 is a side elevation, looking from the left-hand side of Fig. 4, but with the wrapping wheel omitted, Fig. 8 is a section taken on the line VIII—VIII in Fig. 7, Fig. 9 is a front elevation, with the wrapping wheel removed, showing parts which coact with the wrapping wheel to perform the wrap, Figs. 9A, 9B and 9C are detail views on a larger scale showing successive positions assumed by a mechanism for forming a double fold in the wrapper, Fig. 10 is a section on the line X—X in Fig. 9, Fig. 11 is a front elevation of the wrapper feed mechanism, Fig. 12 is a plan view, on a larger scale, of the left hand end of the mechanism shown in Fig. 11, Fig. 13 is a section, on a still larger scale, taken on the line XIII—XIII in Fig. 12, Fig. 14 is an enlarged side elevation, looking from the left hand side of Fig. 4, of the lower part of the wrapping wheel, showing the grippers for feeding the wrapper into position above the elevator, Fig. 15 is a plan view of the feeler arm and its actuating gear, Fig. 16 is a view looking in the direction of the arrow X in Fig. 15, Fig. 17 is a front elevation of the discharge portion of the machine, Fig. 18 is a view similar to that of Fig. 17, but with the end sealing mechanism omitted, Fig. 19 is a corresponding plan view, Fig. 20 is a transverse section through the discharge portion of the machine, taken at the first sealing station, Fig. 20A is a scrap view showing part of the end seal web, and Figs. 21–27 are perspective views showing successive stages in the wrapping of a stack of biscuits.

Like reference numerals designate like parts throughout the figures.

Figure 1:
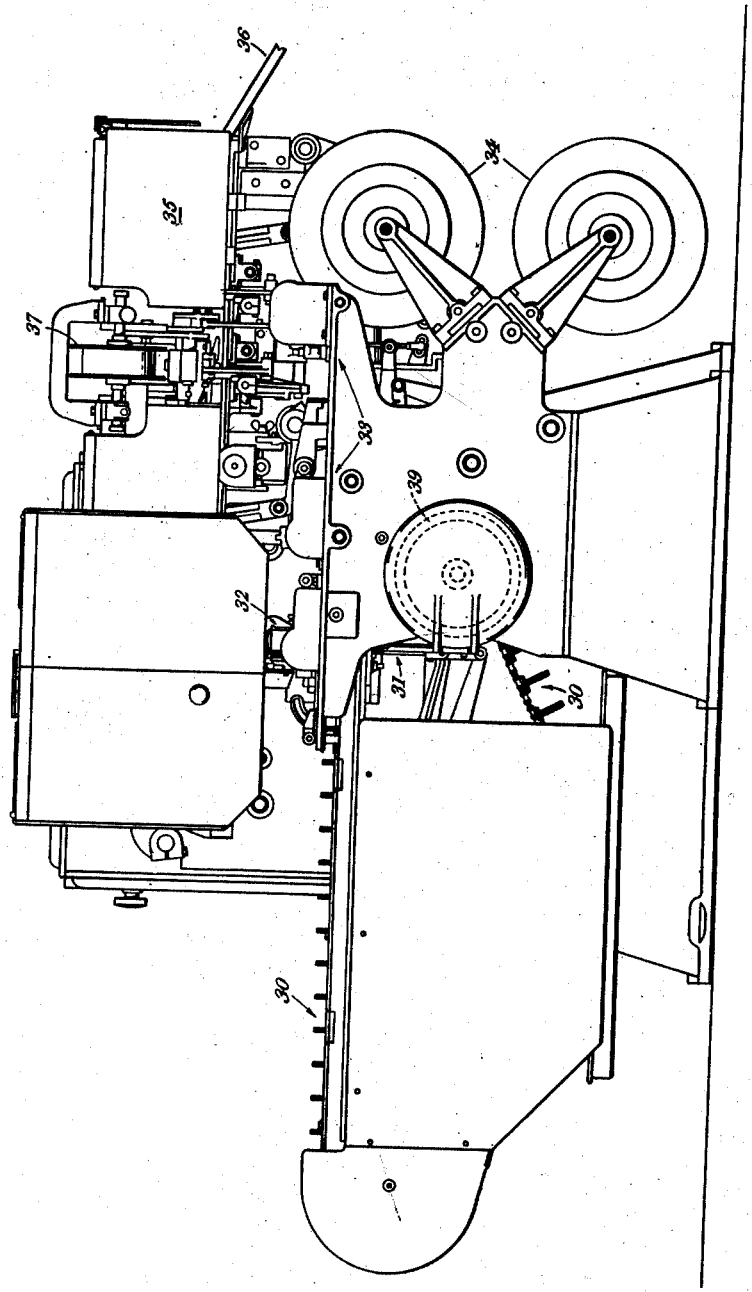
Fig. 1 is a front elevation of the machine.
Figure 2:
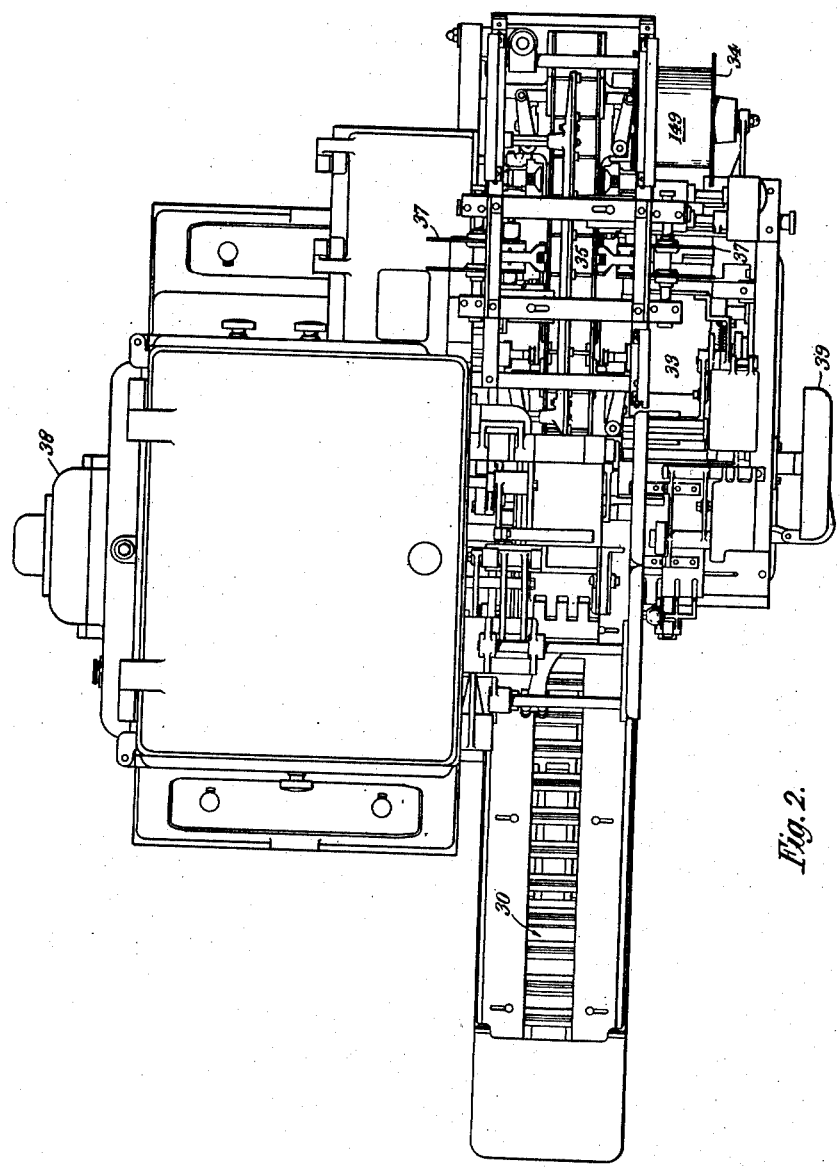
Fig. 2 is a corresponding plan view.

The machine, see Figs. 1 and 2, comprises a conveyor 30 for feeding stacks of biscuits in succession into position above an elevator 31, a wrapping wheel 32 to which the stacks are lifted in succession from the conveyor by the elevator, a wrapper feed mechanism 33, for feeding a web of wrapper from one or other of two reels 34, severing a wrapper from the end of the web at each machine cycle and presenting it in position above the elevator, and discharge mechanism 35 for completing the wrapping of the stacks of biscuits ejected from the wrapping wheel and discharging them in succession down a chute 36. The discharge mechanism also applies to each end of each wrapped package an end seal supplied from a web of end seal material carried on a reel 37.

Figure 3:
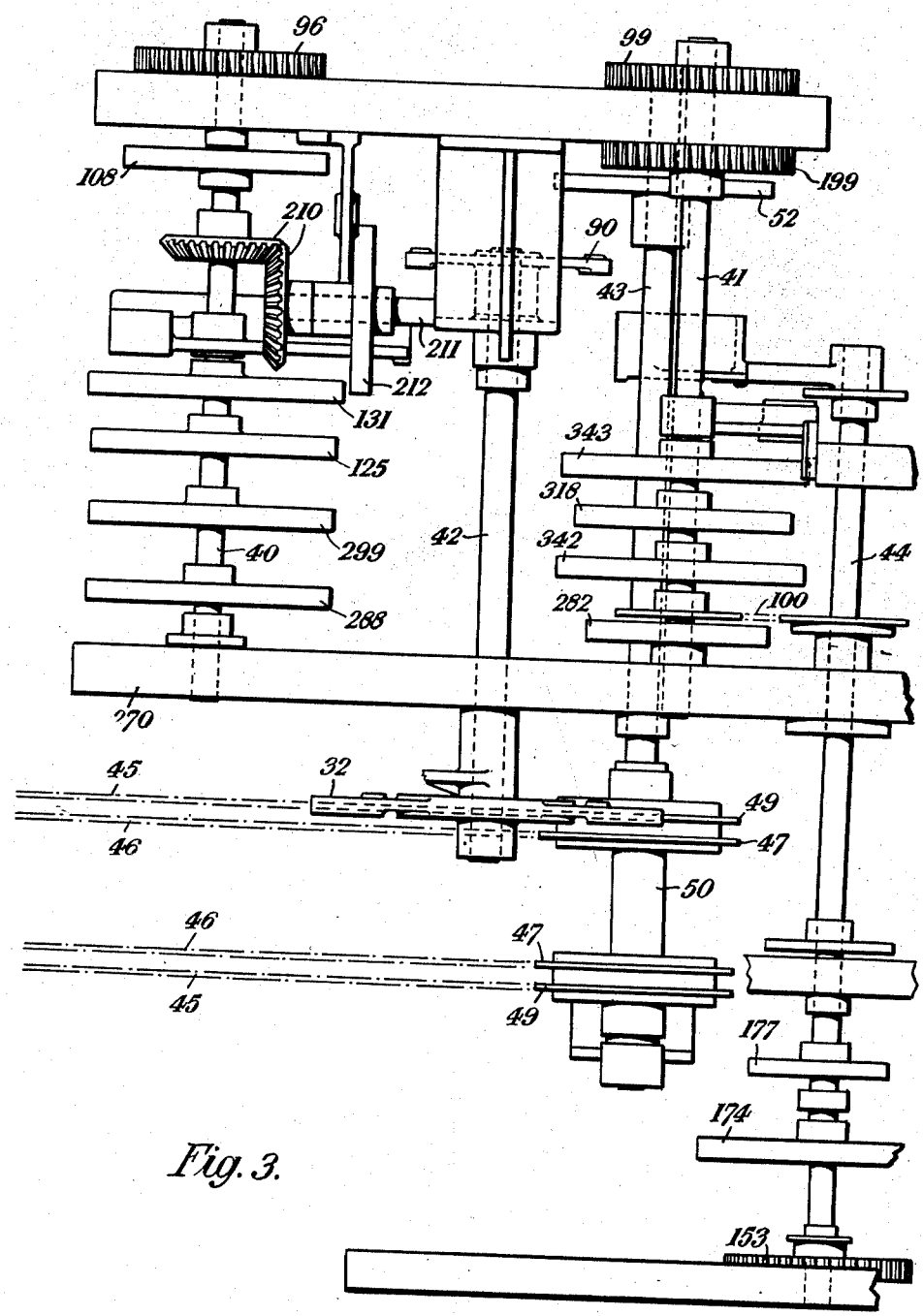
Fig. 3 is a plan view, on a larger scale, showing the cam shafts.

The machine is driven by an electric motor 38 at the rear thereof, but can also be turned manually by means of a hand-wheel 39 at the front. The motor drives, through gearing, shown in Fig. 8, a pair of main cam shafts 40, 41 (Fig. 3), each carrying a number of cams, the functions of which will be described later. Also shown in Fig. 3 are the shaft 42 of the wrapping wheel 32, a shaft 43 for driving the conveyor 30 and a wrapper feed cam shaft 44 driven by a chain drive 100 from the cam shaft 41. The cam shafts 40, 41 are driven from the shaft 92 of the motor 38 through two identical gear trains, shown in Fig. 8. A gear 93 on the shaft 92 drives, through gearing 94 and 95, a gear wheel 96 on the rear end of the cam shaft 40, and the gear 93 drives, through gears 97 and 98, a gear wheel 99 (Fig. 3) on the rear end of the cam shaft 41.

Turning now to Figs. 4–6, the conveyor 30 comprises four chains, viz. two outer chains 45 and two inner chains 46. The inner chains 46 are driven by sprockets 47 (Fig. 6) mounted on a sleeve 48 free on the shaft 43. The outer chains 45 are driven by sprockets 49 each of which is fixed to a sleeve 50 pinned to the shaft 43. Bolts 51 secure the sleeve 48 to the sleeves 50 and impart driving movement to the sleeve 48. The shaft 43 carries a Geneva wheel 52 which is intermittently rotated by a crank pin 53 on a shaft 441 driven by gearing 442 from the cam shaft 41. Mounted on and extending between the outer chains 45, and spaced at equal intervals, are a series of pushers 54. Each of these is constituted by an angle plate, the vertical member 56 of which bears against the rear face of a stack of biscuits 55 (see Fig. 6) and serves to feed the stack forwards, and the horizontal member 57 of which constitutes a ledge for supporting the rear end of the stack of biscuits. Similar angle plates 58 extend between the two inner chains 46 and they are interleaved with the pushers 54. The horizontal members 59 of the angle plates 58 serve as ledges for supporting the front ends of the stacks of biscuits, while their vertical members 60 abut against the front ends of the stacks of biscuits.

Each pusher 54, and the associated angle plate 58 immediately in front of it, thus constitute a pocket to receive a stack of biscuits 55. The sides of the pocket are constituted by a pair of horizontal side control plates 61 which extend into slots 62 (Fig. 5) in the angle plates 54, 58 and are adjustable to accommodate stacks of varying length. To this end the control plates 61 have transverse slots 65 (Fig. 6) engaged by bolts 63 which project upwardly from fixed brackets 64 beneath the control plates. In Figs. 5 and 6, the bolts 63 are shown at the inner ends of the slots 65, and the control plates are accordingly adjusted for a biscuit stack of maximum length. The control plates 61 do not therefore extend into the slots 62 in the angle plates. They will, however, so extend when the control plates are moved inwardly to suit a shorter biscuit stack.

The biscuits are placed in the pockets so that they lie in vertical planes, edge on to the angle plates 54, 58 as shown in Fig. 6. The length of the stack is used herein to designate the dimension transverse to the conveyor, i. e. between the side control plates 61, the width to designate the dimension of the stack lengthwise of the conveyor, and the height to designate the dimension normal to the conveyor. Each pocket is open at the bottom, between the ledges which support the biscuits, the opening being denoted by the reference 66.

The spacing of the side control plates 61 is thus determined by the number of biscuits in the stack. The thickness of each biscuit may vary from time to time during a run, as the result for instance of changes in the dough mixture introduced into the baking oven. The spacing of the side control plates 61 is therefore made such as to be consistent with the maximum expected thickness of the biscuits. Shortly before each pocket reaches the position immediately beneath the wrapping wheel, its contents are tested by a feeler arm 67, having a T-shaped end, which is moved laterally into the pocket as later described. This feeler arm controls a trip mechanism, also described later, for the wrapper feed mechanism, and intercepts the wrapper feed if the pocket is empty of biscuits. The T-shaped end of the feeler arm 67 serves, in cooperation with the side control plate 61 opposite it, to square up the biscuits in the pocket, in case they should have tended to incline from the vertical due to excessive spacing of the side control plates.

The pockets serve to accommodate biscuits of rectangular, round or oval shape, and the conveyor 30 is of sufficient length to provide ample space for the hand feeding of the biscuits into the pockets. Adjustment for variation in the width of the stack is obtained by slackening the bolts 51, rotating the sleeve 48 in relation to the sleeves 50, and retightening the bolts 51. This adjustment is possible because the bolts 51 engage arcuate slots 68 in flanges 69 on the sleeves 50, and it serves to adjust the spacing between the angle plates 54, 58 and therefore the width of the biscuit-receiving pockets. In Fig. 6, these pockets are shown adjusted to the maximum width, the vertical member 60 of each angle plate 58 abutting against the vertical member 56 of the angle plate 54 immediately in front of it. In Fig. 15, however, the pockets are shown adjusted for a stack of biscuits of less width.

The wrapping wheel 32 comprises a plate 70 (Figs. 4 and 5) attached by bolts 71 to a flange 72 on a sleeve 73 fixed to the shaft 42. Integral with the plate 70 are four outstanding arms 74, each of which carries a pocket for receiving a stack of biscuits and a wrapper. The shaft 42 is intermittently rotated, in a clockwise direction as seen in Fig. 4, and through steps of 90°, by mechanism which will shortly be described, to bring the pockets in succession from a bottom loading station A to a folding station B, at which a double fold is made in the wrapper, a top pressing station C and a discharge station D at which the partially wrapped package is discharged from the wrapping wheel on to a horizontal discharge platform 75 Fig. 20 located slightly below the centre line of the wrapping wheel shaft.

Each pocket of the wrapping wheel comprises a pair of jaws, namely a fixed jaw 76 and a movable jaw 77, the faces of which extend, when in the loading position, at right angles to the length of the conveyor 30 and a pair of tuckers 78 shaped to the form of biscuit to be wrapped and pivoted to the fixed jaw on axes parallel to the length of the conveyor. The fixed jaw 76 is at the left hand side of the pocket as seen from the front, when in the loading position, and the movable jaw 77 is pivoted to a pin 79 projecting from the arm 74 in a direction transverse to the conveyor 30 and a spring 80 (shown only in the case of the bottom pocket in Fig. 4) urges the jaw 77 to closed position. At the folding and top pressing stations B and C the movable jaw 77 is thus maintained by its spring 80 gripping the ends of the biscuit contained in the pocket. The jaw 77 has an extension 81, on which is mounted a follower 82. The follower 82 coacts with a cam 83 when the pocket is at the loading station A and with a cam 84 when the pocket is at the discharge station D, and the function of these cams will be described later.

Each tucker 78 has an extension 85 (Fig. 14) pivoted to a pin 430 (Fig. 14) projecting from the arm 74 in a direction parallel to the length of the conveyor 30, and a spring 86 tensioned between arms 87 projecting downwardly from the extensions 85 tends to hold the tuckers closed against the biscuits in the pocket. While the pocket is dwelling at the loading station a cam bar 88 (Fig. 14) is lowered, as later described, and coacts with followers 89 on the arms 87 to open the tuckers 78 to allow of the entry of a stack of biscuits into the pocket.

The intermittent drive is imparted to the wrapping wheel by the mechanism shown in Fig. 8. Fixed to the rear end of the wrapping wheel shaft 42 is a four-armed member 90 (see also Fig. 3) carrying a stud 91 at the end of each of its arms. A slotted driving member 101, driven by a pair of parallel cranks 102, 103, periodically engages the studs 91 to impart the desired step-by-step movement to the shaft 42. The crank 102 is driven from a gear wheel 199 on the cam shaft 41 by a gear wheel 104 and imparts movements to the other crank 103 through gears 105, 106, 107. As the cranks 102, 103 rotate anticlockwise from the position shown in Fig. 8, the slotted member 101 is moved to the left to engage the stud 91 to the left of it. The slotted member 101 is then drawn downwardly to rotate, through the agency of the engaged stud 91, the shaft 42 through 90°. It is then retracted to the right and finally returned to the position shown in Fig. 8 ready to engage the stud 91 on the next arm of the member 90.

A cam 108 on the cam shaft 40 (see also Fig. 3) coacts with a follower 109 to rock a bell crank lever 110 periodically about its pivot 111. A notch 112 at the end of the bell crank lever 110 engages one of the studs 91 to lock the wrapping wheel shaft 42 against rotation during its period of dwell, but the bell crank lever 110 is moved aside by the cam 108 to free the stud 91 engaged by the notch 112 immediately prior to engagement of the slotted driving member 101 with the opposite stud 91.

When the wrapping wheel 32 dwells, the conveyor pocket containing the leading stack of biscuits dwells beneath it, with its pusher 54 immediately below the fixed jaw 76 of the wrapping wheel pocket which is at the loading station, as shown in Fig. 4. A cut length 113 of wrapper is fed, as later described, into position between the stack of biscuits and the wrapping wheel. The elevator 31 then rises, through the opening 66 in the base of the conveyor pocket, to lift the stack of biscuits and the wrapper 113 into the pocket of the wrapping wheel.

The elevator 31 comprises a plunger 114, pivoted at 115 to a bell crank lever 116 which is, in turn, pivoted at 117. The plunger 114 is also pivoted at 118 to a link 119 pivoted at 120. The bell crank 116 is coupled, by a link 121 which is variable in length to adjust the stroke of the elevator, to a second bell crank 122, pivoted at 123 and carrying a follower 124 coacting with a cam 125 (see also Fig. 8) on the cam shaft 40. Pivoted in scissors fashion at 431 (Fig. 5) to the lifting plunger 114 are two grippers 126, and a compression spring 127 acting on the lower ends of the grippers 126 urges their upper ends inwards to engage the faces of the two outermost biscuits of the stack. In the lowered position of the elevator shown in Fig. 5, followers 128 on the grippers 126 are held by fixed cam bars 129 in a position such that the grippers 126 are open. As the elevator rises, the cam bars 129 allow the grippers 126 to close to grip the stack of biscuits near its lower end. At the same time a top plunger 130, actuated by another cam 131 (see Figs. 3 and 9) descends through the wrapping wheel pocket to apply pressure to the top of the biscuit stack and the wrapper resting thereon. The top plunger 130 is projected by a spring 132 (Fig. 5) from a top plunger carrier 133 and has sufficient freedom of movement in relation to the carrier 133 to cater for variations, from minimum to maximum, in the height of the package. The top plunger carrier 133 is shaped, as shown in Figs. 4, 5 and 9, to clear the jaws of wrapping wheel pocket and carries the cam bar 88 (see also Fig. 14) which is attached to the carrier 133 by screws 134 and, as the top plunger descends, opens the tuckers 78 of the wrapping wheel pocket, as already described.

The top plunger carrier 133 (see Fig. 9) is adjustably mounted, by a bolt 135 engaging a slot 136 in the carrier 133, on a member 137 pivoted at its lower end to a bell crank 138, pivoted at 139, and at its upper end to a link 140 pivoted at 141. The bell crank 138 carries a follower 142 coacting with the cam 131.

After the top plunger 130 has descended on top of the stack of biscuits in the pocket of the conveyor, and the tuckers 78 of the wrapping wheel pocket have been opened, as already described, the elevator 31 and top plunger 130 ascend, lifting the stack of biscuits, with the wrapper 113 folded around it in U-formation (see Fig. 21), into the pocket of the wrapping wheel. The cam bar 88 on the carrier 133 clears the tuckers 78 as the packet rises in to the wrapping wheel pocket, allowing the tuckers 78 to spring back and grip the faces of the two outermost biscuits and, at the same time, to produce first end tucks at opposite ends of the package. One of these end tucks is shown at 143 in Fig. 21. Shortly after the tuckers 78 have closed on the package, the cam bars 129 cause the elevator grippers 126 to release their hold on the package. The cam 83 associated with the moving jaw 77, which up to this stage has been holding the jaws open allows the jaw 77 to close and support the end of the package opposite the fixed jaw 76. The wrapping wheel 32 then commences to move, to carry the package clear of the elevator grippers 126 whereafter the elevator descends again.

The cam 83 is mounted on a shaft 144 (Fig. 9), driven by gears 145, 146, 147, 148 from the cam shaft 40.

In order to cater for different sizes and shapes of biscuits, the elevator 31 and wrapping wheel 32 are exchanged for corresponding members appropriate to the changed requirements. The wrapping wheel 32 is detachably mounted on its shaft 42 by the bolts 71, as already described, so that it may easily be exchanged. Adjustment of the stroke of the elevator 31 is obtained by altering the length of the link 121 (Fig. 4). The manner in which the shape of the pockets in the conveyor 30 can be varied has already been described. The new wrapping wheel 32 substituted for the purpose of dealing with biscuits of different size or shape will, in all cases, have its fixed pocket wheel jaws 76 so disposed that, when brought to the loading station, they will be immediately above the pusher 54 of the conveyor pocket immediately below the wrapping wheel pocket while, when brought to the discharge station, they will be flush with the discharge platform 75.

The wrapper feed mechanism, shown in Figs. 11–14, will now be described. The conveyor 30 and discharge platform 75 are parallel to one another, the discharge platform 75 being, of course, at a higher level than the conveyor. The wrapper 149, which is made of heat sealing thermoplastic material, is fed from one of the reels 34, and in Fig. 11 the wrapper is shown being fed from the upper reel. The wrapper is fed from the reel, as will be seen from Fig. 2, along a path parallel to but forward of the discharge platform 75, the wrapper 149 travelling in the reverse direction to the conveyor 30. Portions 113 (Fig. 4) are cut consecutively from the leading end of the web of the wrapper, and then fed transversely to the path of feed of the web by the mechanism shown in Fig. 14, into position above the elevator.

This disposition of the wrapper feed has the advantage that printed matter extending lengthwise of the wrapper will not be obscured by the double fold or by the end seals which, as later described, are applied to the ends of the package.

The wrapper 149 passes, from the reel 34, between a pair of feed rollers 150, 151 (Fig. 11). The roller 150 is loosely mounted on a shaft 152 which is continuously driven, by gears 153, 154 and a belt drive 155, from the wrapper feed cam shaft 44. The other roller 151 is fixed to a shaft 156 geared to the shaft 152 by gear wheels 157. The shaft 156 is mounted on a pair of arms, one of which is shown at 158, fixed to a shaft 159 carrying an arm 160 by means of which the arms 158 can be periodically rocked to and fro, as later described, to bring the roller 151 away from the wrapper, without bringing the gears 157 out of mesh, so interrupting the wrapper feed. The wrapper 149 passes downwards from the feed rollers 150, 151 beneath a jockey pulley 161 mounted on an arm 162, pivoted at its other end 163 to a slotted arm 234, and thence, upwardly over another feed roller 164, to a horizontal table 165 along which it is intermittently fed by upper and lower feed rollers 166, 167 to a cutting station E.

The feed rollers 166, 167 are geared together by gears 168, the lower feed roller 167 being periodically oscillated by a quadrant 169 meshing with the lower gear 168. The quadrant 169 receives movement from a link 170 pivoted to the upper end of a lever 171. The lever 171 is pivoted at its lower end on a fixed pivot 172 and carries a follower 173 coacting with a wrapper feed cam 174 on the shaft 44 (see also Fig. 3). A pin and slot connection 175, 176 between the link 170 and the quadrant 169 permits of adjustment of the stroke of the quadrant and therefore of the length of wrapper fed, per cycle, to the cutting station E. A knife cam 177 on the shaft 44 (see also Fig. 3) imparts, through a follower 178, periodic up and down movement to a lever 179. At its upper end, the lever 179 is pivoted to an arm 180, fixed to a shaft 181 and connected at its other end, by a link 182, to an oscillating arm 183 mounted on a fixed pivot pin 184. Pivoted at 185 to the arm 183, and linked to the arm by a spring 186, is an arm 189 carrying at its upper end a movable knife 187. Each time the arm 183 is oscillated clockwise by the cam 177, the knife 187 is lifted and coacts with a fixed knife 188 to sever a length of wrapper from the leading end of the web 149 of wrapper fed forward by the feed rollers 166, 167.

The upper feed roller 166 is mounted on a shaft 190 (see also Fig. 12), supported by a pair of arms 191, which are pivoted at their rear ends on pivot pins 192. Also pivoted on the pivot pin 192 shown in Fig. 11 is a rearwardly extending arm 193 carrying at its rear end a clamp 194 and urged in a clockwise direction by a spring 195. Rollers 196, 197 on the arms 191, 193 respectively coact with cam faces 198, 200 on a lever 201 fixed to the shaft 181. Whenever the arm 183 is oscillated in a clockwise direction by the cam 177 to cause the wrapper to be cut, as just described, the lever 201 is rocked counter-clockwise, and this allows the clamp 194 to be pressed down by the spring 195 to clamp the portion of the wrapper behind the feed rollers 166, 167 and then lifts the upper feed roller 166. At this time the quadrant 169 has completed its forward stroke and the feed rollers 166, 167 are at rest. The moving knife 187 remains in the up position with the upper feed roller 166 raised clear of the bottom feed roller 167 during the return stroke of the quadrant 169 and consequent reverse rotation of the feed rollers. Then, while the quadrant 169 is at rest at the end of its return stroke, the cam 177 permits a spring 202 coupled to the oscillating arm 183 to rock the latter anticlockwise, to lower the movable knife 187 and restore the lever 201 to the position shown in Fig. 11, in which the cam surface 198 allows the upper feed roller to return to its lowered position and the cam surface 200 thereafter raises the clamp 194. The feed rollers 166, 167 are thus in readiness for the next forward feed of the web. While the knife 187 is cutting, a plunger 203 (Fig. 13) is moved upwards, as later described, against the undersurface of the portion of the wrapper 113 ahead of the knife, and presses the wrapper against a top plate 204, so preventing the wrapper from swivelling while being cut.

Reference has already been made to a feeler arm 67 (Figs. 6 and 15) which coacts with the conveyor 30 to test whether the pockets therein contain biscuits. This feeler arm controls the position of a trip member 205 (Figs. 11 and 15), which ensures that the wrapper feed will be interrupted when there are no biscuits in the pocket tested. In such circumstances, the trip member 205 is rocked, as later described and after the arm 183 has been moved clockwise to cause the knife 187 to operate, into position below a nose 206 on the arm 183, so preventing the spring 202 from returning the arm 183 and holding the upper feed roller 166 in the raised position. One machine cycle is required for transfer of a cut wrapper 113 from the cutting station E to a position above the elevator 31. During this cycle, the cut wrapper is fed forward by feed rollers 207, 208 (Fig. 11) and is thereafter fed, in a direction transverse to its previous direction of travel, by a pair of grippers 209 (Figs. 12 and 14). These operations will be described later. The feeler arm 67 accordingly tests the conveyor wheel pocket F (Fig. 6) which is immediately behind the pocket G which is disposed above the elevator 31. Consequently if the feeler arm 67 fails to detect biscuits in the pocket at station F, the wrapper feed will be interrupted by the trip member 205 and prevent a wrapper from being positioned above the empty conveyor pocket when it reaches station G.

The mechanism by which the feeler arm 67 controls the trip member 205 is shown in Figs. 7, 15 and 16. Geared by bevel gears 210 (see also Fig. 3) to the cam shaft 49 is a shaft 211 carrying a wrapper trip cam 212. A bell crank 213, pivoted at 214, carries a follower 215 which coacts with the cam 212. The bell crank 213 is coupled by a link 216 to a collar 219 fixed to a rod 217 mounted to slide in guides 218 and 220. The feeler arm 67 carries a projection 221 (Fig. 15) which is urged by a spring 222 into contact with an upturned lip 223 at the forward end of a plate 224 fixed to the front end of the rod 217. A finger 225 is pivoted at 226 to the plate 224 and a spring 227 holds a roller 228 on the finger against a cam face 229 on the projection 221.

The rod 217 moves downwardly, as seen in Fig. 15, on its forward stroke and the spring 222 causes the feeler arm 67 to follow it and to move into the pocket of the conveyor. If biscuits are present, the feeler arm 67 is arrested, and the rod 217 continues to move down. The roller 228 accordingly rides down the now arrested cam face 229, and the spring 227 causes the finger 225 to rock clockwise to bring its tip 230 clear of a notch 231 in the trip member 205, which is pivoted at 232 and normally held in the position shown in Fig. 15 by a spring 233. Should, however, the pocket contain no biscuits, the feeler arm 67 containues to move forwardly with the rod 217 and the finger 225 is held in the position shown in Fig. 15. Its tip 230 accordingly engages the notch 231 in the trip member 205, rocking the latter anti-clockwise into position to intercept the nose of the arm 183, thereby holding the arm 183 in its rocked position and interrupting the wrapper feed as already described.

The slotted arm 234 (Fig. 11) to which the arm 162 carrying the jockey pulley 163 is attached, is pivoted at its lower end to a fixed stud 235 and has, at its upper end, a slot 236 cooperating with a pin 237. A spring 238 tensioned between the pin 237 and a pin 239 on the arm 234 constrains the arm 234 to occupy one of two positions, in which the pin 237 is disposed at opposite ends of the slot 236. The arm 234 is connected by a link 240 to a pair of toggle links 241, the upper of which has a slot 242 engaging a pin 243 on the arm 160.

In the position of the arm 234 shown in Fig. 11, the toggle links 241 are at an angle to one another, and the feed roller 151 is in engagement with the feed roller 150. The wrapper is accordingly being payed out from the reel 34. As the bight of the wrapper supporting the jockey pulley 161 lengthens, the jockey pulley drops and, just as the quadrant 169 is about to make its forward stroke to cause the feed rollers 166, 167 to draw the wrapper forward from the bight, the jockey pulley 161 reaches a level at which it snaps the arm 234 over into its other position in which the pin 237 is at the left hand end of the slot 236. This straightens the toggle links 241, so rocking the arm clockwise to move the feed roller 151 away from the roller 150, so terminating the feed of wrapper from the reel. As the slack in the bight is taken up by forward feed of the wrapper by the rollers 166, 167, the jockey pulley 161 will be lifted again and when it reaches a certain position it causes the arm 234 to move over dead centre again into the position shown in Fig. 11, thus returning the feed roller 151 into position to feed the wrapper from the reel.

So long therefore as the feed rollers 166, 167 are operative, the jockey pulley 161 periodically causes a length of wrapper to be fed from the reel 34 to form a bight which can be fed forward by the feed rollers 166, 167. When the latter are caused, by the trip member 205, to cease feeding, the jockey pulley 161 remains in the lowered position, thereby interrupting the feed from the reel 34, until such time as the feed rollers 166, 167 again become operative.

The end of the portion of wrapper in advance of the knife 187 is fed, by the intermittent feed rollers 166, 167 into position between a pair of constantly rotating feed rollers 207, 208 of which mention has already been made. The rollers 207, 208 are driven from the shaft 44 by a chain 244 engaging a sprocket 245 (Figs. 11, 12 and 13) fixed to a gear wheel 246 through which the drive is passed to a gear wheel 247 on the shaft of the lower roller 208 and thence, through gears 248, to the upper roller 207. The latter is supported by a pair of arms 249, pivoted at their rear ends on a pin 250, and one of the arms 249 carries followers 251, 257 which coact respectively with cams 252, 256 (Fig. 13). The cam 252 is fixed to the sprocket 245 and turns with the sprocket in relation to a fixed pin 255. The cams 252, 256 thus periodically lift the upper feed roller 207 clear of the wrapper and lower it again into contact with the wrapper. The bolts 253 engage arcuate slots 254 in the cam 256 and adjustment of the bolts 253 in the slots 254 permits of adjustment of the cam 256 in relation to the cam 252 to vary the time in the machine cycle at which the wrapper feed roller 207 will be lowered into engagement with the wrapper. This permits of adjustment of the position to which the cut wrapper will be fed to suit packages of different widths.

Also fixed to the sprocket 245 is a cam 436 (Fig. 13) which coacts with a follower 437 on a yoke 438 carrying the plunger 203. The cam 436 normally holds the yoke 438 in the position shown, but when the knife 187 is cutting a low portion of the cam comes opposite the follower 437 and a spring 439 raises the yoke 438 to press the plunger 203 against the undersurface of the wrapper as already mentioned.

When the upper roller 207 is down, the severed length of wrapper is fed forward against a stop constituted by a series of prongs 258 (Fig. 12) engaging slots 259 in the feed table. The prongs are mounted on a carriage 260 carrying a bolt 261 projecting downwardly into a longitudinal slot 262 in the feed table. By adjusting the bolt 261 in this slot, the position of a stop can accordingly be varied so as to ensure that the wrapper will be correctly positioned in relation to the centre line of the package.

The grippers 209, which feed the severed wrappers in succession, transversely to the direction of the wrapper feed, into position above the elevator 31, are shown in Figs. 12 and 14. Each gripper comprises a lower jaw 263 and an upper jaw 264 pivoted to the lower jaw at 265 and urged by a spring 266 to the closed position shown. Each upper jaw carries a follower 267 which coacts with a plate 268. The lower jaws 263 are fixed, each to a rod 269 which is mounted to slide in a guide 277 and a frame member 270. The rods 269 are reciprocated by a crank 271 on the shaft 211, which is joined by a link 272 to an arm 273, pivoted at its upper end 274 and connected at its lower end by a link 275 to a collar 276 fixed to the rods 269.

The plates 268 are joined by a structure 278 coupled to an arm 279 integral with an arm 280 carrying a follower 281 which coacts with a wrapper gripper opening cam 282 on the cam shaft 41 (see also Fig. 3). When the plates 268 are caused to descend by the cam 282 they depress the followers 267 and open the grippers.

The timing of the reciprocating movement of the plates 268 is such that the grippers 209 are moved open by the crank 271 to the centre line of the wrapper feed, then allowed to close by ascent of the plates 268 to engage opposite sides of the wrapper, then retracted by the crank 271, drawing the wrapper with them, until the centre line of the wrapper is aligned with the centre line of the conveyor and then opened by the descent of the plates 268. The elevator 31, as it rises, carries the wrapper upwards, the edges of the wrapper bending to allow it to leave the grippers 209. The rods 269 then move forward again with the grippers 209 open to collect the next wrapper.

After the stack of biscuits 55 and the wrapper have been lifted into the wrapping wheel pocket at the loading station A, the wrapper 113 being folded about the biscuits as shown in Fig. 21, the wrapping wheel 32 moves through 90° to bring the pocket to the folding station B. At the folding station is provided folding mechanism described in U. S. application Serial No. 219,015, now U. S. Patent 2,612,740. On arrival of the pocket at said folding station, as indicated in Fig. 9A, the upper projecting wing 283 of the wrapper comes into contact with a rotary folder 284 (see also Fig. 9) constituted by a pair of folding blades forming a cleft 285 between them. An oscillating tucker blade 286, carried by an arm 287 fixed to a shaft 293, receives movement from a cam 288 (Fig. 3) on the cam shaft 40 through the agency of a follower 289, a bell crank 443, a link 290 and an arm 291 fixed to the shaft 293, and after the wrapping wheel pocket has arrived at the folding station the tucker blade 286 moves, as shown in Fig. 9A, to force the projecting wings of the wrapper into the cleft 285 between the blades of the folder 284, thereafter retiring to its initial position. The blades of the folder 284 are slightly bevelled to provide a lead for the entry of the wrapper and tucker blade 286 into the cleft 285 and to avoid any danger of the wrapper being dragged out of the cleft by friction as the tucker blade 286 retires. The forcing of the wrapper into the cleft 285 forms the first part 292 of a double fold in the wrapper, as shown in Fig. 22 which shows the package at the stage of wrapping indicated in Fig. 9B.

It will be appreciated that the amplitude of movement of the tucker blade 286 into the cleft 285 determines the width of the double fold made in the wrapper. Also the action of the tucker blade 286 forcing the wings of the wrapper into the cleft 285 tends to tighten the wrapper around the package. Adjustment of the effective stroke of the tucker blade 286 and therefore of the extent to which it will penetrate into the cleft 285 and the width of the double fold, can be readily effected by adjusting the position of the tucker blade arm 287 in relation to the shaft 293.

The rotary folder 284 is connected to a gear wheel 294 engaging a toothed wheel 295 which is now rocked, by a link 296 and bell crank 297, carrying a follower 298 engaging a double fold rotation cam 299 (Fig. 3) on the cam shaft 40, to rotate the rotary folder 284 away from its initial position, in which the cleft 285 faces downwardly, to a position shown in Fig. 9C in which the cleft 285 faces upwardly and inwardly. This action forms the second part of the double fold, which is shown completed in Fig. 23, and brings the rotary folder 284 into a position such that the wrapper can be withdrawn from it on further movement of the wrapping wheel. During such further movement a fold retaining blade 301 presses the double folded wrapper against the package as the double fold 300 is pulled out of the cleft 285 between the blades of the rotary folder 284. This retaining blade 301 is mounted on an arm 302 pivoted to the wrapping wheel shaft 42 and coupled to the rotary folder by an eccentric 303 fixed to the rotary folder, a link 304 embracing the eccentric and a pin 305. This coupling brings the retaining blade 301 into the operative position shown in Fig. 9C, when the rotary folder 284 is rotated into the discharge position, and returns the retaining blade 301 into inoperative position when the rotary folder 284 is afterwards turned back into its initial receiving position (Fig. 9A), this action taking place after the wrapper has been withdrawn from the rotary folder. The rotary folder 284 is adjustable for height in relation to the wrapping wheel shaft, so as to accommodate it to packages of different sizes. To this end, the rotary folder 284, the shaft 306 carrying it, and the oscillating gear wheel 295 are mounted on a plate 307 having slots 308 engaging bolts 309 for securing the plate to the machine frame member 270, so that the plate 307 can be adjusted in a vertical direction in relation to the machine frame.

The above-described mechanism for forming the double fold is adapted for use with a considerable range of wrapping materials, will accommodate a considerable degree of variation in the size of the package, and is readily adjustable to vary the width of the double fold.

When the package is oversize, there is a minimum amount of projecting wrapper, and a relatively short length of wrapper will be pushed into the cleft 285 of the rotary folder. The first fold, produced by the introduction of the wings of the wrapper into the cleft, will therefore be of less width than the second fold, formed by folding the projecting parts of the wrapper down towards the article by the rotation of the fold. In the case of a package of mean size, these two folds will be of substantially equal width. In the case of an undersize package, however, an excess amount of wrapper will project and the effect will be to produce a triple fold, the extra fold being produced by a portion of wrapper which is pressed against the package by the folder blade nearest the article as the rotary folder moves into the position shown in Fig. 9C.

An arcuate plate 310 extends around the wrapping wheel between the folding station and the pressing station C (see also Fig. 4). Here a heated sealing member 311 (Fig. 9) is caused to descend on the double fold. This heat sealing member, which is moved from the ejector mechanism which will shortly be described, presses resiliently on the double fold 300 and forms a heat seal in the package at that point. The double fold is shown so pressed in Fig. 24. Where a non-heating sealing wrapping material is used, e. g. parchment paper, the heat sealing member is not heated and serves merely to press the double fold. The effect of heat sealing the double fold is to lock the wrapper securely to the package, so that it cannot come off except if it be torn.

The next step of movement of the wrapping wheel brings the package to the discharge station D. Here a cam operated ejector plunger 312 acts to force the package out of the wrapping wheel and on to the discharge platform 75. The ejector plunger 312 is mounted on an arm 313 fixed to an arm 314. The arm 314 is coupled by a link 315, which is adjustable in length to vary the stroke of the ejector plunger, to a bell crank 316 carrying a follower 317 coacting with a cam 318 on the cam shaft 41 (see also Fig. 3). The arm 314 carries a roller 319, which coacts with a tail 320 on the top presser arm 321 to rock the latter about its pivot 322 and so imparts the necessary movements, under control of the cam 318, to the heat sealing top presser 311.

As the wrapping wheel pocket approaches the discharge station D, the pivoted jaw 77 thereof is partly opened (see Fig. 4) by movement into contact with the jaw opening cam 84, which rotates with the bell crank 316 under control of the cam 318. Thereafter rotation of the cam 84 serves further to open the jaw 77. A head 323 on the ejector plunger 312 spreads the tuckers 78 as the plunger 312 travels forward. The plunger 312 can thus travel for the full width of the pocket, and so prevent the tuckers 78 from snapping back on to the package before it has left the pocket. The movement imparted to the heat sealing top presser 311 by the ejector mechanism is quite small. It is lifted slightly so that the double fold on the package approaching the pressing station can pass beneath it. Then, as the ejector plunger 312 moves forward, the top presser 311 is lowered and remains down for a substantial time to effect heat sealing of the double fold.

The package ejected on to the discharge platform 75 passes into position between a pair of parallel discharge plates 324, one at each side of the platform, which form a second tuck 329 (see Fig. 25) at each end of the package, leaving only tails 325, 326 projecting from both ends of the package at top and bottom through slots 327, 328 in the discharge plates.

The package requires completion by folding up the tails 326, as shown in Fig. 26, and finally by folding down the tails 325 and the application of end seals 432 to the ends of the package as shown in Fig. 27. It will be appreciated that the package has been turned through 90° on its way from the position of Fig. 21, which it occupies at the loading station, to the position of Figs. 22 and 23, which it occupies at the folding station, then through a further 90° on its way to the top pressing position, Fig. 24, and finally through a further 90° on its way to the position of Figs. 25 and 26, which it occupies on the discharge platform 75.

The discharge plates 324 are floating. That is to say they are mounted so that they can spread outwardly against the action of springs 330 (Fig. 19) in case the length of the package (i. e. the dimension thereof transverse to the discharge platform 75) should exceed that for which the discharge plates 324 are set. The plates 324 will normally be set to the minimum limit of the expected range of variation in length of the packets and will accordingly always press against the ends of the packets, to grip the wrappers firmly around them, as the packets move along on the platform 75. The ends of the plates 324 adjacent the ejector are tapered at 371 (Fig. 19) to provide a lead in for the packets. Each plate 324 has, at each end, a projecting lug 331 (Figs. 18 and 19). Each lug 331 is coupled by a pair of superposed pivoted links 332, 333 to a fixed lug 334 on the machine frame. Below each lower link 333 is a bracket 335 pivoted on the fixed lug 334 and attached to the link 333 by an adjustable pin and slot connection 336, 337. The springs 330 extend traversely between stops 338 projecting downwardly from the brackets 335 to maintain the stops 338 against the machine frame. By adjusting, by means of the pins 336, the brackets 335 in relation to the links 333, the spacing of the plates 324 can be varied. The plates 324 can be removed, and replaced by others appropriate to packages of different shape by removing pins 339 coupling them to the links 332, 333.

The packages are moved intermittently along the discharge platform 75 by a claw bar 340 carrying a number of downwardly projecting claws 341. This claw bar receives movement from a pair of cams 342, 343 (Fig. 3) on the cam shaft 41 which operate to lower it to bring the claws 341 behind the packages on the platform 75, then to move it forwards so that the claws will push the packages along the platform, then to raise it to lift the claws clear of the packages and finally to move it rearwardly to its initial position. The claw bar 340 is coupled by pins 344, 345 to a pair of levers 346, 347 (Fig. 18) joined at their lower end by a link 348. Horizontal movement is imparted to the claw bar by rocking the levers 346, 347 about their points of pivotal attachment 349, 350 to a pair of bell cranks 351, 352. The cam 342 coacts with a follower 353 on a bell crank 354, pivoted on a shaft 355 and carrying an arm 356 coupled by a link 357 to the lower end of the lever 347 to give this horizontal movement. The other cam 343 coacts with a follower 358 on a bell crank 359 coupled by a spring link 360 to an arm 361 pivoted on the shaft 355 and fixed to the bell crank 351. The cam 343 is thus effective to rock the bell cranks 351, 352, which are joined by a link 362, about their pivots and so to impart vertical movement to the claw bar 340.

Each of the claws 341 carries, as shown in Fig. 18, a forwardly projecting bracket 363 (some of which only are shown in the drawings) in which is mounted a rubber plunger 364, urged downwardly by a spring 365, which presses on the top of the package ahead of the claw. These plungers 364 serve to apply sufficient pressure to the packages to enable them to operate a trip mechanism described later. Also, in the case of round or oval biscuits they serve to prevent rolling of the biscuits during their travel along the discharge platform 75. The claw bar 340 is removable, by removing the pins 344, 345, and interchangeable with others appropriate to packages of different lengths.

Mention has already been made of the longitudinal slots 327, 328 in the ends of the discharge plates 324 near the ejector, into which the top and bottom tails of the wrapper project. The lower slots 328 have inclined portions 366 which fold the bottom tails 326 down on to the package (as shown in Fig. 26) and inclined portions 367 of the upper slots 327 thereafter fold the top tails 325 down on to the package.

The packages then move on to two sealing stations H and I, at the first of which an end seal 432 is applied to each end of the package (Fig. 27) and at the second of which the formation of the end seal is completed.

Where parchment paper is used as the wrapping material, a gum pot 368 (Fig. 17) is employed at each side of the discharge platform, the gum pots including gumming rollers 369 which apply gum to the undersurface of the bottom tails 326 of the wrapper faces before they are folded up. The gumming rollers 369 at opposite sides of the discharge platform are mounted on a shaft 370, carrying a ratchet 372 (Fig. 18) which is periodically rotated by a pawl 373 on a link 374 coupled to the bell crank 354. The pressers, described later, which operate on the ends of the package at the two sealing stations will then cause the gum to stick the tails together.

The operations which take place at the sealing stations will now be described with reference to the case in which the wrapper is of heat sealing material.

At each side of the discharge platform is mounted (Fig. 20) a reel 37 of end seal material. This consists of a web 375 (see Fig. 20A) of end seals 432 united by narrow necks and carrying a heat sealing thermoplastic material on its inner face. The web 375 is fed from each reel around a roller 384 and thence, towards an aperture 376 in the adjoining discharge plate 324 at the first sealing station H, by an intermittently driven peg roller 377, the pegs 378 of which engage between adjacent seals of the web. An arcuate plate 379 holds the web down on to the peg roller 377 and, in cooperation with another guide member 380, guides the web from the peg roller to the aperture 376 in the discharge plate. The movement of the peg rollers 377 is obtained as follows, during forward movement of the claws 341, from the cam 342 which imparts horizontal movement to the claw bar. The arm 356 (Fig. 17) oscillated by this cam is coupled by a spring 381 to a bell crank 382 and as the claws 341 move the packages forward along the discharge platform 75 the spring 381 is tensioned and so tends to rock the bell crank 382 and thereby to lift a push rod 383. The upper end of the push rod 383 (see Fig. 20) is connected to an oscillating lever 385 which is coupled to a pair of links 386, 390, and upward movement of the push rod 383 draws the link 386 down, thereby causing it to rock an arm 387 and cause a pawl 388 carried by that arm to rotate a ratchet 389 connected to the left hand peg roller (not shown) and so to feed the leading end seal of the web 375 into the aperture 376 in the associated discharge plate 324. The other link 390 is operated in similar fashion to actuate the ratchet (not shown) of the right hand peg roller 377. Counter-clockwise movement of the lever 385 is, however, normally prevented by a catch 391, pivoted on a pin 392, and held by a spring 393 in a position, shown in Fig. 20, in which it engages a nose 394 on the lever 385. Attached to the catch 391 is a trip member 440 which is held by the spring 393 in a position in which it projects upwardly, through the discharge platform 75, as shown in Figs. 17 and 20. The trip member is located in a position such that it will be depressed by the packet of biscuits about to be fed to the first sealing station. When a packet of biscuits is in position above the trip member, the weight of the biscuits, aided by the pressure of the plunger 364 pressing on top of the biscuits, depresses the trip member 440 and disables the catch 391; so that the cam 342, in addition to causing horizontal forward movement of the biscuits to the first sealing station, will be effective to feed end seals into position opposite the ends of the package. If, however, there are no biscuits above the trip member 440, the catch 391 will be effective and the movement of the arm 356 (Fig. 17) by the cam 342 will be idle, merely stretching the spring 381, and the end seal feed will be interrupted.

Each peg roller 377 (Fig. 20) is adjustably mounted, as later described, on a shaft 395 extending parallel to the discharge platform and carrying the ratchet 389 which imparts the intermittent feed movement to the peg roller. Each shaft 395 is mounted in a bracket 396 which is adjustable, as later described, for height in relation to a second bracket 397 which, in turn, is adjustable in relation to the machine frame transversely of the discharging platform.

Each aperture 376 in the discharge plates has a V-groove 433 in its bottom edge, into which the leading edge of the leading end seal is fed by the associated peg roller 377, the end seal occupying an inclined position with its trailing edge outward of its leading edge.

Alongside each aperture 376 is a lever 398 pivoted at its lower end to a bracket 399 and having pivoted at 400 to its upper end a member 401 carrying a knife 402 and an end presser and heat sealer 403. Springs 434 urge the levers 398 inwards into contact with their respective brackets 399. Each bracket 399 is mounted on a bracket 424 fixed to a rod 404 mounted for lengthwise movement in a guide 405 below the discharge platform. The two rods 404 are disposed side by side, as shown in Figs. 18 and 19 and the brackets 399 are disposed at opposite sides of their respective rods so that the knives 402 and end pressers 403 carried by the two brackets are opposite one another.

The left hand rod 404 is attached by a cross head 407 to the left hand one of a pair of rods 406, and a similar cross head 408 extends between the right hand rod 404 and the right hand rod 406. The rods 406 operate end pressers and heat sealers at the second sealing station, the lever (similar to levers 398) supporting one of these end pressers being shown at 409 in Fig. 17.

After the end seals have been fed into position in the V-grooves 433 the rods 404, 406 are moved to approach the end pressers to the packages by the following mechanism operated by the cam 343 which imparts vertical movement to the claw bar 340. Fixed to the bell crank 351 (Fig. 18), which it will be remembered is oscillated by the cam 343, is an arm 410 coupled to the lower end of a rod 411. The rod 411 is connected at its upper end (Fig. 19) to an arm 412 attached to a sleeve 413. An arm 414 projecting upwardly from the sleeve 413 is connected by a link 415 to the cross head 408 and an arm (not shown) projecting downwardly from the sleeve 413 is connected by a link 416 to the cross head 407. The end pressers are thus moved in towards opposite ends of the packages at the two sealing stations and thereafter moved outwardly again.

During such inward movement of the brackets 399 (Fig. 20) at the first sealing station, the springs 434 permit of relative movement of the brackets 399 and levers 398 should the knives 402 or end pressers 403 be arrested before the rods 404 complete their movement. The knives 402 cooperate with fixed knives 417 to cut off the leading end seals from each web, and tend to push the severed end seals into upright positions. The end pressers 403, which are slightly in advance of the knives 402, push the central portions of the end seals against opposite ends of the package, sealing these central portions to the package and also causing adhesion of the overlapping parts of the wrapper over the central zone of the package at each end.

The upper and lower parts of each end seal rest against the outer face of the associated discharge plate 324. As the package moves on to the second sealing station, fixed tongues 418 (Fig. 18) on the discharge plates push the ends of the end seals towards the package, so straightening them out.

At the second sealing station I end pressers and heat sealers are moved in by the rods 406, as already described, through apertures 419 (Fig. 18) in the associated discharge plate, against each end of the package. These heat sealers are formed of two portions, indicated in end view at 420 in Fig. 17, and bear against the ends of the package above and below the zones at which a partial end seal was made at the first sealing station. They thus complete the sealing of the end seal to the package and ensure adhesion of the overlapping parts of the wrapper over the zones above and below that sealed at the first sealing station. The levers supporting the end pressers at the second sealing station are spring mounted on brackets on the rods 406 just as the corresponding levers 398 at the first sealing station are mounted on the rods 404.

After leaving the second sealing station the finished packages are fed by the claws to the discharge chute 36.

It is necessary to provide for adjustment of the peg rollers 377 in three directions to cater for different sizes of biscuits and different lengths of package. Adjustments for height in relation to the discharge platform and transversely in relation to the discharge platform are respectively obtained by slackening clamping screws 421 (Fig. 20) which secure the brackets 396 carrying the peg rollers to the associated brackets 397, and by slackening clamping screws 422 securing the brackets 397 to the machine frame, moving the brackets to the required fresh position and tightening the clamping screws again.

Each peg roller 377 is adjustable longitudinally of its associated shaft 395 by slackening a clamping screw 423 which secures it to the shaft. After making this adjustment, it is necessary to line up the reel 37 carrying the end seal material and the arcuate plate 379 and associated guide member 380 to suit the new position of the peg roller.

When a peg roller has been adjusted, the cam operated linkage 385, 386, 387, may no longer feed the web correctly into the bottom of the V-groove 397 in the aperture in the discharge plate. To correct for this, the web is fed forward to its maximum position and then, making sure that the pawl 388 is in contact with a tooth of the ratchet wheel 389, the clamping screw 423 securing the peg roller to its shaft is slackened, and the roller 377 rotated until the web is correctly presented in the V-groove. The clamping screw 423 is then tightened again.

The member 401 carrying each end seal heat sealer and knife only requires to be adjusted for height and to suit varying lengths of package, since the knife and heat sealer are wide enough to cater for the range of adjustment of the peg roller longitudinally of the discharge platform. The adjustment for length of package is provided by releasing clamping screws 425 connecting the bracket 424 to the rod 404, moving the bracket 424 in and out in relation to the rod and re-tightening the screws 425. The bracket 399, by releasing a clamping screw 426, is adjustable for height in relation to the bracket 424 attached to the rod 404. An adjusting screw 427 serves to maintain the knife 402 and end presser 403 in horizontal position.

All of the above-mentioned adjustments are conveniently provided with index plates which enable the adjustments to be readily made for reading suitable for the size and packet length of biscuits required.

The heaters sealers, which operate at the second sealing station may be adjusted in relation to their operating rods 406 in the same fashion as that just described in the case of the heat sealers at the first sealing station.

The heaters of the heat sealers at the two sealing stations receive a current sufficient to keep them at a low sealing temperature during sealing of the first three or four packages to pass through the machine. One passage of the packages through the heaters and past the end seal trip member 394, a microswitch, controlled by the trip member, makes a circuit. This microswitch circuit cuts out a resistance and causes an increase of current through the heaters, thus enabling the input of heat to keep up with the output of heat during the continuous passage of packages through the heaters. The trip mechanism again operates the microswitch, to reduce the supply of heat to the heaters, when there is a gap in the supply of packages to the sealing stations.

There is also a manual adjustment for varying the difference of temperature between bottom and top heat. All the heat sealing faces of the heaters are made in the form of a flexible grid which acts as a resistor which, on the passage of a suitable current, preferably of low voltage, will cause a rise in temperature of the grid sufficient to allow the grid to act as a flexible hot sealing platen.

Also a spring supported plunger made of insulating material is used to create a permanent convex set on the front face of each of the heat sealers to ensure contact on panelled or irregular faces at the ends of the packages.

What we claim as our invention and desire to secure by Letters Patent is:

1. In a machine for wrapping stacks of loose biscuits and the like, the combination of a wrapping wheel mounted to rotate on a horizontal axis, said wrapping wheel having a plurality of pockets, means for imparting intermittent rotation to said wrapping wheel to move the pockets in succession from a loading station to a discharge station, a horizontal discharge platform at the discharge station, each of said pockets having a fixed jaw, which extends vertically when the pocket is at the loading station and horizontally in alignment with said discharge platform when the pocket is at the discharge station, and a movable jaw which coacts with the fixed jaw to hold the stack of biscuits, a conveyor having a plurality of spaced pushers for feeding stacks of biscuits forwards along a horizontal path to position beneath the wrapping wheel, means for imparting intermittent movement to said conveyor in timed relation with the movement of the wrapping wheel to bring the pushers successively into alignment with the fixed jaw of the pocket of the wrapping wheel which is dwelling at the loading station, an intermittently operating elevator for raising the stacks of biscuits successively from the conveyor into the pockets of the wrapping wheel on arrival of said pockets at the loading station, and means for feeding wrappers in succession into the path of the elevator so that a wrapper will be carried into the pocket at the loading station by each stack of biscuits, as it is lifted, and thereby folded in U-formation about the stack of biscuits.

2. In a machine for wrapping stacks of loose biscuits and the like, a combination as claimed in claim 1, wherein each pocket of the wrapping wheel comprises a hinge for the movable jaw and a spring for urging said movable jaw towards the fixed jaw, and comprising a cam adapted to coact with the movable jaw of the pocket at the loading station, means for rotating said cam to open the movable jaw as a stack of biscuits is lifted into the pocket and thereafter to allow said jaw to close to grip said stack, a further cam adapted to coact with the movable jaw of the pocket at the discharge station, and means for rotating said further cam to open the movable jaw at said discharge station to permit of ejection of a partially wrapped package from the wrapping wheel.

3. In a machine for wrapping stacks of loose biscuits and the like, a combination as claimed in claim 1, in which each pocket of the wrapping wheel comprises a pair of pivoted tuckers, extending when closed at right angles to the fixed jaw, and a spring urging said tuckers to the closed position, and comprising a reciprocating top presser for pressing against the top of the stack of biscuits as it is lifted into the pocket at the loading station and a cam, controlled by said top plunger, for opening the tuckers as the top presser descends and thereafter allowing the tuckers to close on the stack of biscuits contained in the pocket.

4. In a machine for wrapping stacks of loose biscuits and the like, a combination as claimed in claim 3, comprising a carrier for the top presser, a cam for imparting reciprocating movement to said carrier, and a spring holding said top presser projected from said carrier.

5. In a machine for wrapping stacks of loose biscuits and the like, the combination with a wrapping wheel of a conveyor for feeding said stacks in succession along a horizontal path to a loading station beneath said wrapping wheel and an elevator arranged to lift said stacks in succession from the conveyor to the wrapping wheel, said conveyor comprising a pair of horizontal side control plates, extending along the length of the horizontal run of the conveyor, a plurality of upstanding front and rear plates, each rear plate defining with one of the front plates and said side control plates a biscuit-receiving pocket, the front and rear plates of each pocket having inwardly projecting flanges for supporting the biscuits and said flanges defining between them a space to allow said elevator to enter the base of the pocket and lift the biscuits therefrom, a driving mechanism for imparting common intermittent forward movement towards the loading station to said rear plates, another driving mechanism for imparting common intermittent forward movement to said front plates simultaneously with the forward movement of the rear plates, means for effecting simultaneous adjustment of said front plates towards and away from said rear plates, and means for adjusting the distance between said side control plates.

6. In a machine for wrapping stacks of loose biscuits and the like, a combination as claimed in claim 5, wherein said conveyor comprises a pair of chains carrying the rear plates, another pair of chains carrying the front plates, an intermittently moving drive shaft and sprockets on said drive shaft for imparting movement from said drive shaft to said chains, said sprockets being relatively adjustable on said drive shaft to vary the spacing between said front and rear plates.

7. In a machine for wrapping stacks of loose biscuits and the like, the combination with a wrapping wheel arranged to move intermittently on a horizontal axis, an intermittently moving conveyor for feeding said stacks in succession to a loading station beneath said wrapping wheel, a horizontal discharge platform located parallel to and above said conveyor and on the opposite side of the wrapping wheel from the conveyor, said platform serving to receive partly wrapped packages from the wrapping wheel, means for moving the packages intermittently along the platform, means for applying end seals to the packages when they reach a certain station on the platform, a reel of wrapper, wrapper feed mechanism for feeding a web of wrapper from the reel along a path parallel to, offset from and below said platform, said web travelling in the opposite direction to said conveyor, means operating in timed relationship with the conveyor and wrapping wheel for periodically severing a wrapper from the leading end of said web, feed mechanism for severing the cut wrappers in succession transversely to the path of the feed of the web and into position between the conveyor and the wrapping wheel, and an elevator which operates periodically to lift a stack of biscuits from the conveyor and to carry it with a cut wrapper into the wrapping wheel.

8. In a machine for wrapping stacks of loose biscuits and the like, the combination with a wrapping wheel of a conveyor for feeding said stacks in succession along a horizontal path to a loading station beneath said wrapping wheel and an elevator arranged to lift said stacks in succession from the conveyor to the wrapping wheel, a reel of wrapper, intermittently operating feed rollers for feeding a web of wrapper continuously from the reel, a knife for periodically severing a wrapper from the leading end of the web, a trip mechanism, controlled by the stacks of biscuits on the conveyor, for rendering said feed rollers and knife inoperative, when necessary, to prevent abortive feeding of the web, a jockey pulley resting on a bight of wrapper between the feed rollers and the reel, means controlled by the jockey pulley according to its level for intermittently feeding the web from said reel to said rollers, the feed of web from the reel commencing when the jockey pulley has ascended to a given level and ceasing when, as a result of the feed, the jockey pulley has descended to another given level, and means for feeding the cut wrappers in succession into the path of the elevator so that each stack of biscuits will carry a wrapper with it as it is lifted into the wrapping wheel.

9. In a machine for wrapping stacks of loose biscuits and the like, a combination as claimed in claim 8, wherein the conveyor is arranged to move intermittently and has spaced pockets to contain the stacks of biscuits and comprising a feeler arm, means for moving the feeler arm, during each period of dwell of the conveyor, into a pocket of the conveyor disposed to the rear of that above the elevator, to test whether said pocket is occupied, said feeler arm coacting with said trip mechanism, when said pocket is empty, to render said trip mechanism effective to interrupt temporarily the wrapper feed.

10. In a machine for wrapping stacks of loose biscuits and the like, a combination as claimed in claim 9, and comprising a cam, an arm acuated periodically by the cam to operate the knife and also to move one of the feed rollers away from the web, a spring for returning the arm, and a trip member arranged to be displaced by the feeler, when it enters an empty pocket, to intercept the arm and prevent its return by the spring to position to resume the wrapper feed.

11. In a machine for wrapping stacks of loose biscuits and the like, a combination as claimed in claim 10, comprising a reciprocating member for actuating the feeler arm, a spring for constraining the feeler arm to follow the movement of the reciprocating member, and a finger on the reciprocating member normally positioned to engage the trip member and move it to position to intercept the cam-operated arm, said feeler arm, when arrested by a stack of biscuits in the pocket coacting with said finger to move it into position to miss the trip member.

12. In a machine for wrapping stacks of loose biscuits and the like, a combination as claimed in claim 11, wherein said trip member is constituted by a bell crank normally held in inoperative position by a spring and having a nose for engagement by the finger and wherein the finger is pivoted to the reciprocating member and held by a spring with a follower on the finger engaging a cam face on the feeler arm, said cam face being effective, on continued forward movement of the reciprocating member after the feeler arm has been arrested, to displace the finger into position to miss the nose on the bell crank.

13. In a machine for wrapping stacks of loose biscuits and the like, a combination as claimed in claim 8, wherein the wrapper feed mechanism comprises a second pair of feed rollers for feeding the web from the reel to the jockey pulley and comprising a toggle linkage, controlled by the jockey pulley in accordance with its level, for periodically moving one of said second pair of feed rollers away from the web to interrupt the feed of the web from the reel.

14. In a machine for wrapping stacks of loose biscuits and the like, a combination as claimed in claim 13, comprising an arm supporting the jockey pulley, a slotted arm pivoted on a fixed pivot, pivoted to said arm and coupled to said toggle linkage, a pin engaging a slot in the slotted arm and a spring constraining said slotted arm to occupy one or other of alternative end positions defined by engagement of the pin with the slot, said jockey pulley being effective, as it rises and falls, to effect a snap action movement of the slotted arm between said alternative end positions.

15. In a machine for wrapping stacks of loose biscuits and the like, the combination of a wrapping wheel mounted to rotate on a horizontal axis, said wrapping wheel having a plurality of pockets, each of said pockets comprising a pair of tuckers adapted to grip a stack of biscuits between them, means for rotating the wrapping wheel intermittently to bring the pockets in succession to a loading station, an intermittently operating conveyor having a series of biscuit-receiving pockets, each with a hole in its bottom, for moving the stacks of biscuits successively into position beneath the loading station, mechanism operating in timed relationship with the wrapping wheel and the conveyor to feed wrappers in succession into position between the conveyor and the loading station, an elevator, grippers on said elevator for engaging opposite ends of a stack of biscuits, mechanism for periodically raising the elevator through the bottom of the conveyor pocket dwelling beneath the loading station to lift the stack of biscuits therefrom and into the wrapping wheel pocket at the loading station, said stack carrying a wrapper with it as it enters said wrapping wheel pocket, and thereafter lowering the elevator again, and a reciprocating top plunger for applying pressure to the top of the stack of biscuits and the wrapper resting thereon as said stack is lifted into said wrapping wheel pocket.

16. In a machine for wrapping stacks of loose biscuits and the like, a combination as claimed in claim 15, wherein said top plunger coacts with said tuckers to open them as the top plunger descends and comprising a spring for closing said tuckers on said stack as the latter enters said wrapping wheel pocket.

17. In a machine for wrapping stacks of loose biscuits and the like a combination as claimed in claim 16, comprising a spring urging said grippers to closed position and a fixed cam which coacts with said grippers during upward travel of the elevator, said cam maintaining said grippers open in the bottom position of the elevator, allowing said grippers to close as the elevator ascends into the conveyor pocket and causing said grippers to open again after said tuckers have closed on the biscuits.

18. In a machine for wrapping stacks of loose biscuits and the like, the combination with a wrapping wheel for folding a wrapper around each stack of biscuits, a discharge platform for receiving partially wrapped packages from the wrapping wheel, a pair of floating discharge plates, disposed one on each side of the discharge platform, springs urging said discharge plates inwards to engage the ends of the packages on said discharge platform, a frame adjoining said discharge platform, links pivotally connecting opposite ends of each discharge plate to the frame, a bracket associated with each link and pivoted to said frame, and an adjustable pin and slot connection between each bracket and its associated link, said brackets coacting with said frame to determine the spacing of said discharge plates.

19. In a wrapping machine, the combination of a discharge platform, means for feeding wrapped packages in succession along the discharge platform to a sealing station, discharge plates for supporting the ends of the packages on the discharge platform, a reel of end sealing material, intermittently operating feed mechanism for feeding a web of end sealing material forward, step by step, from said reel to present its leading edge opposite an aperture at the sealing station in one of said discharge plates, a carrier member, a knife and a presser both supported by said carrier member, and means for periodically reciprocating said carrier member transversely to said discharge platform and thereby operative to sever an end seal from the end of said web and to press said severed end seal through said aperture and against the end of the package at said sealing station.

20. In a wrapping machine, the combination of a discharge platform, means for feeding wrapped packages in succession along the discharge platform to a sealing station, discharge plates for supporting the ends of the packages on the discharge platform, a reel of end sealing material, intermittently operating feed mechanism for feeding a web of end sealing material forward, step by step, from said reel to present its leading edge opposite an aperture at the sealing station in one of said discharge plates, a trip mechanism controlled by the packages travelling along the discharge platform and operative to arrest the end seal feed in the event of a gap in the procession of packages on said platform, a carrier member, a knife and a presser both supported by said carrier member, and means for periodically reciprocating said carrier member transversely to said discharge platform and thereby operative to sever an end seal from the end of said web and to press said severed end seal through said aperture and against the end of the package at said sealing station.

21. In a wrapping machine, a combination as claimed in claim 19, wherein the means for feeding the packages along the discharge platform comprises a claw bar, a number of downwardly depending claws on said claw bar, a cam mechanism for moving the claw bar horizontally forwards, then upwards clear of the packages, then horizontally rearwards and then downwards to re-engage the packages, and comprising a spring loaded plunger on each claw for pressing on top of the package in advance of the claw, a trip member projecting upwardly from the discharge platform and a catch normally positioned by the trip member to render the feed mechanism for the end seals ineffective, said trip member, when depressed by an advancing package, serving to displace the catch to position to render said feed mechanism operative.

22. In a wrapping machine, a combination as claimed in claim 21, in which the cam mechanism comprises a first cam for imparting horizontal movement to the claw bar and a second cam for imparting vertical movement to said claw bar, and comprising mechanism operated by the first cam for actuating the end seal feed mechanism and mechanism operated by the second cam for imparting reciprocating movement to said carrier member.

23. In a machine for wrapping stacks of loose biscuits and the like, the combination with a wrapping wheel mounted on a horizontal axis, said wheel having a plurality of pockets, a pair of spring loaded tuckers in each pocket for gripping a stack of biscuits inserted into said pockets, means for rotating said wheel intermittently to carry said pockets successively from a loading station to a folding station, then to a top pressing station and finally to a discharge station, means at the loading station for lifting stacks of biscuits, each with a wrapper folded around it in U-formation, in succession into the wrapping wheel, means at the folding station for folding the projecting wings of wrapper around each stack of biscuits, a top presser at the top pressing station for pressing the fold formed in the wrapper at the folding station, an ejector at the discharge station, means for periodically moving the ejector along the full length of the pocket at the discharge station to open the tuckers and eject the wrapped package from said pocket, and means coupling the ejector and top presser for imparting movement to said top presser from said ejector.

24. In a wrapping machine for wrapping loose biscuits, a combination as claimed in claim 23, comprising an arm carrying the ejector, a bell crank, a cam for oscillating said bell crank, a linkage coupling said bell crank to said arm and serving to impart movement from said cam to said ejector, a pivoted arm carrying said top presser and a pin on said linkage which coacts with said arm to impart movement to said top presser.

25. In a wrapping machine, the combination of a discharge platform, means for feeding wrapped packages in succession along the discharge platform to a sealing station, discharge plates for supporting the ends of the packages on the discharge platform, one of said discharge plates having therein at the sealing station an aperture formed with a V-groove in its lower edge, intermittently operating feed mechanism for feeding a web of end sealing material forward, step by step, in an inwardly and downwardly inclined direction to locate the leading edge of said web in said V-groove, a carrier member, a knife and a presser both supported by said carrier member, said presser being disposed nearer to said discharge plate than said knife, and means for periodically reciprocating said carrier member transversely to said discharge platform and thereby operative to sever an end seal from the end of said web and to press said severed end seal through said aperture and against the end of the package at said sealing station.

ALEXANDER RUSSELL.
ALAN HOPTON.
ARTHUR FRANCIS CARTER.

UNITED STATES PATENTS

| Number | Name | Date |
|---|---|---|
| 1,107,474 | Baker | Aug. 18, 1914 |
| 1,266,686 | Johnson | May 21, 1918 |
| 1,462,326 | De Escobales | July 17, 1923 |
| 1,626,379 | Armstrong | Apr. 26, 1927 |
| 1,875,979 | Beutel | Sept. 6, 1932 |
| 1,946,697 | Johnson et al. | Feb. 13, 1934 |
| 1,955,493 | Grover | Apr. 17, 1934 |
| 2,077,431 | Neumair | Apr. 20, 1937 |
| 2,080,858 | Dorman | May 18, 1937 |
| 2,094,497 | Ross | Sept. 28, 1937 |
| 2,373,655 | Bronander | Apr. 17, 1945 |
| 2,443,952 | Gilbert | June 22, 1948 |
| 2,578,948 | Sandberg | Dec. 18, 1951 |